United States Patent
Niewczas et al.

(10) Patent No.: US 9,667,352 B2
(45) Date of Patent: May 30, 2017

(54) ULTRASONIC COMMUNICATIONS FOR WIRELESS BEACONS

(71) Applicant: Facebook, Inc., Menlo Park, CA (US)

(72) Inventors: Mateusz Marek Niewczas, Menlo Park, CA (US); Fraidun Akhi, Fremont, CA (US); Shizhe Shen, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/593,971

(22) Filed: Jan. 9, 2015

(65) Prior Publication Data

US 2016/0204879 A1 Jul. 14, 2016

(51) Int. Cl.
*H04B 5/00* (2006.01)
*H04B 11/00* (2006.01)

(52) U.S. Cl.
CPC .................................... *H04B 11/00* (2013.01)

(58) Field of Classification Search
CPC .......... H04M 1/72577; G06Q 10/1095; G06Q 20/209; G06Q 20/3224; H04W 4/021
USPC ....................................................... 455/41.1
See application file for complete search history.

(56) References Cited

U.S. PATENT DOCUMENTS

| | | | |
|---|---|---|---|
| 4,004,140 A | 1/1977 | Izumi et al. | |
| 6,898,434 B2 | 5/2005 | Pradhan et al. | |
| RE38,899 E | 11/2005 | Fischer et al. | |
| 8,634,853 B2 | 1/2014 | Bogatin | |
| 8,695,403 B2 | 4/2014 | Pernel et al. | |
| 9,603,013 B2 | 3/2017 | Niewczas et al. | |
| 2003/0125058 A1 | 7/2003 | Matsutani et al. | |
| 2005/0136845 A1 | 6/2005 | Masuoka et al. | |
| 2006/0041750 A1 | 2/2006 | Carter et al. | |
| 2006/0170591 A1 | 8/2006 | Houri et al. | |
| 2006/0252411 A1 | 11/2006 | Huckins | |
| 2009/0217043 A1 | 8/2009 | Metke et al. | |
| 2010/0031036 A1 | 2/2010 | Chauncey et al. | |
| 2010/0052989 A1 | 3/2010 | Canoy | |
| 2011/0090123 A1 | 4/2011 | Sridhara et al. | |
| 2011/0188657 A1 | 8/2011 | Kweon et al. | |
| 2012/0151089 A1 | 6/2012 | Ponmudi et al. | |
| 2012/0284517 A1 | 11/2012 | Lambert et al. | |
| 2013/0065584 A1 | 3/2013 | Lyon et al. | |

(Continued)

OTHER PUBLICATIONS

U.S. Appl. No. 15/190,029 by Niewczas, M.M. et al., filed Jun. 22, 2016.

(Continued)

*Primary Examiner* — Wesley Kim
*Assistant Examiner* — Raj Chakraborty
(74) *Attorney, Agent, or Firm* — Perkins Coie LLP

(57) ABSTRACT

Beacon devices transmit wireless beacon messages to alert an application on a mobile phone of the Beacon device's proximity. Contemplated beacon devices may also include an ultrasonic emitter and one or more microphones. The ultrasonic emitter may be used to complement other beacon operations, communicate information to a user mobile device, and monitor the beacon device's environment. Ultrasonic data may also be used to determine if a person or object is in proximity to the beacon device. Short echolocation travel times may be used to indicate that a user is "touching" the beacon device. Inter-beacon device communication may also be accomplished using the ultrasonic emitter.

17 Claims, 32 Drawing Sheets

(56) References Cited

U.S. PATENT DOCUMENTS

| | | | |
|---|---|---|---|
| 2013/0106577 A1 | 5/2013 | Hinman et al. | |
| 2013/0263223 A1 | 10/2013 | Cherian et al. | |
| 2013/0336093 A1* | 12/2013 | Suvanto | G01S 15/06 367/99 |
| 2014/0162606 A1 | 6/2014 | Cherian et al. | |
| 2014/0215594 A1 | 7/2014 | Lambert et al. | |
| 2014/0220883 A1 | 8/2014 | Emigh et al. | |
| 2014/0273963 A1 | 9/2014 | Su et al. | |
| 2014/0366105 A1 | 12/2014 | Bradley et al. | |
| 2015/0264432 A1* | 9/2015 | Cheng | H04N 21/44218 725/10 |
| 2015/0289207 A1 | 10/2015 | Kubo et al. | |
| 2015/0341766 A1 | 11/2015 | Nelson et al. | |
| 2015/0348146 A1* | 12/2015 | Shanmugam | G06Q 30/0603 705/71 |
| 2015/0356289 A1 | 12/2015 | Brown et al. | |
| 2016/0047887 A1 | 2/2016 | Niewczas et al. | |
| 2016/0050219 A1 | 2/2016 | Niewczas et al. | |
| 2016/0050564 A1 | 2/2016 | Niewczas et al. | |
| 2016/0302066 A1 | 10/2016 | Niewczas et al. | |

OTHER PUBLICATIONS

Final Office Action mailed May 19, 2016, for U.S. Appl. No. 14/460,891 of Niewczas, M., filed Aug. 15, 2014.
Notice of Allowance mailed May 24, 2016, for U.S. Appl. No. 14/460,880 of Lai, D., filed Aug. 15, 2014.
U.S. Appl. No. 14/460,880 by Niewczas, et al., filed Aug. 15, 2014.
U.S. Appl. No. 14/460,886 by Niewczas et al., filed Aug. 15, 2014.
U.S. Appl. No. 14/460,891 by Niewczas, et al., filed Aug. 15, 2014.
Getting Started with iBeacon Version 1.0 by Apple, dated Jun. 2, 2014, 11 pages.
Location and Maps Programming Guide by Apple, dated Mar. 10, 2014, 89 pages.
Wagner, C., "Developing iOS 7 Applications with iBeacons Tutorial." Apr. 22, 2014, 16 pages.
Non-Final Office Action mailed Dec. 17, 2015, for U.S. Appl. No. 14/460,891 of Niewczas, M., filed Aug. 15, 2014.
Non-Final Office Action mailed Oct. 7, 2015, for U.S. Appl. No. 14/460,880 of Lai, D., filed Aug. 15, 2014.
Notice of Allowance mailed Apr. 1, 2016, for U.S. Appl. No. 14/460,880 of Lai, D., filed Aug. 15, 2014.
Notice of Allowance mailed Jan. 11, 2017, for U.S. Appl. No. 14/460,891 of Niewczas, M., filed Aug. 15, 2014.
Corrected Notice of Allowance mailed Feb. 16, 2017 for U.S. Appl. No. 14/460,891 of Niewczas, M., filed Aug. 15, 2014.
Non-Final Office Action mailed Mar. 27, 2017, for U.S. Appl. No. 14/460,886 of Niewczas, M., filed Aug. 15, 2014.

* cited by examiner

ULTRASONIC COMMUNICATIONS FOR WIRELESS BEACONS

TECHNICAL FIELD

The disclosed embodiments relate to systems and methods for Bluetooth® beacon device management.

BACKGROUND

The ubiquity of personal mobile computing devices ("mobile devices") presents many opportunities for context-based interaction with users. Unfortunately, various technical hurdles limit the degree to which various systems can provide this contextual functionality. For example, Quick Response (QR) and bar codes require the user to actively capture images within a short distance of an object, Radio-Frequency Identification (RFID) tags may similarly require close proximity, and exclusively Global Positioning System (GPS)-based applications may be difficult to integrate with object placement so that the user device and object correspondence may be readily determined. Although Bluetooth® systems may provide an appropriate range and data transfer, standing alone, they often fail to provide the secondary functionality necessary to implement various context-sensitive applications.

In addition, Bluetooth® system functionality rarely addresses all the business needs of various users. For example, while the omnidirectional emission of beacon messages to recipients may facilitate simple notification schemes, business owners may desire more specific control over how messages are received. Business owners may desire that only certain users receive messages under certain conditions and that beacon devices operate efficiently within a larger system consolidating information. Furthermore, communications exclusively in the wireless medium limit the scope of information that can be conveyed between a beacon device and a user, as well as between beacon devices. Existing protocols may not enable a beacon device distributor to coordinate and/or verify the appropriate installation of beacon devices.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
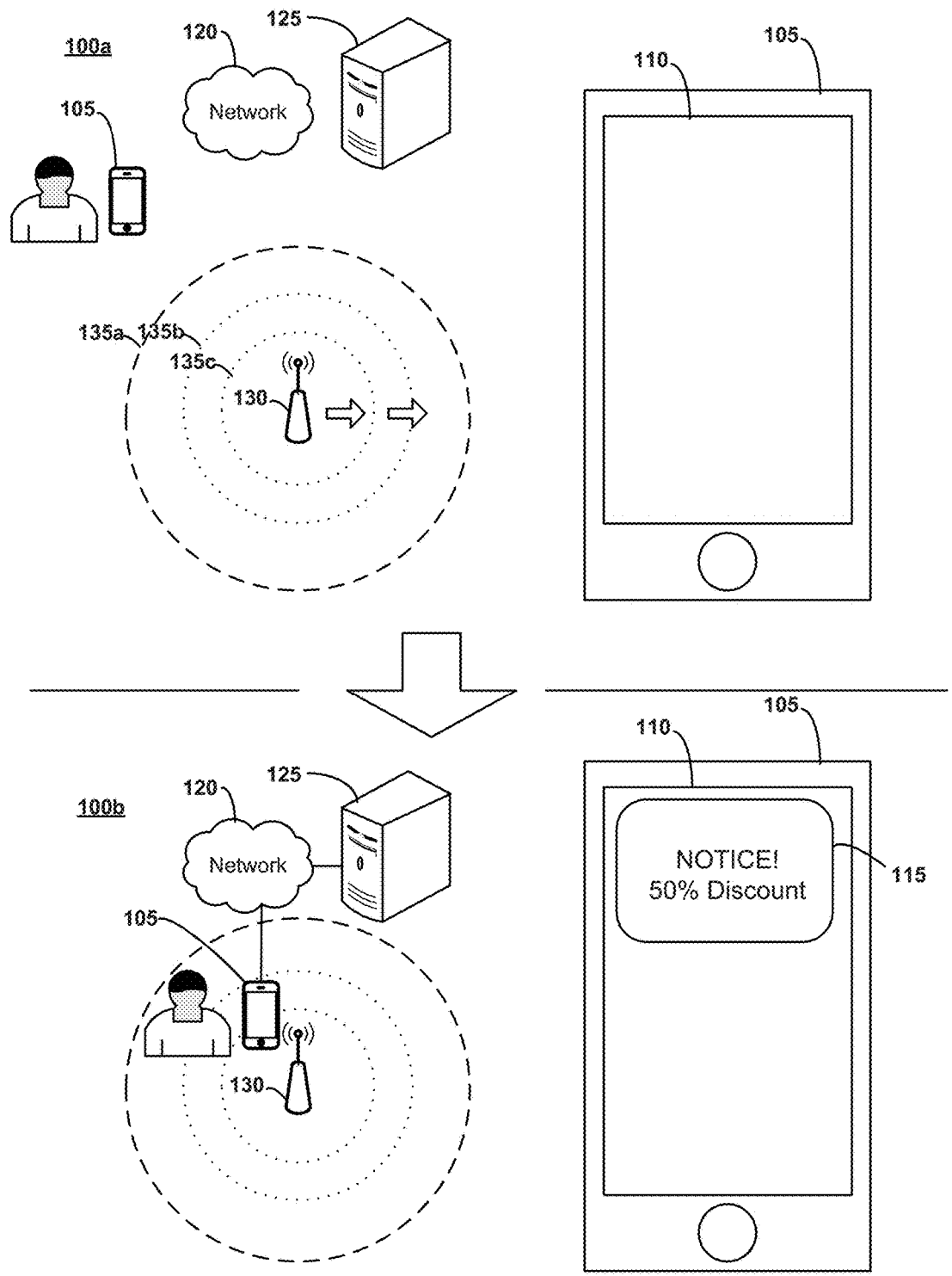
FIG. 1 is a block diagram illustrating an example interaction between a user device and a beacon device as may occur in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

In various of the disclosed embodiments, beacon devices transmit wireless beacon messages to alert an application on a mobile phone of the beacon device's proximity. Beacon devices may also include an ultrasonic emitter and one or more microphones. The ultrasonic emitter may be used to complement other beacon operations, communicate information to a user mobile device, and monitor the beacon device's environment. For example, ultrasonic data may be used to determine if the beacon is in an enclosed space, violating a user agreement. Ultrasonic data may also be used to determine if a person or object is in proximity to the beacon device. Short echolocation travel times may be used to indicate that a user is "touching" the beacon device. Inter-beacon device communication may also be accomplished using the ultrasonic emitter. Ultrasonic operation may be coupled with a user mobile device. For example, an application on the user mobile device may compare wireless strength and ultrasonic signal strength to determine if the beacon device is in an enclosed region.

Various embodiments will now be described in further detail. The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other obvious features not described in detail herein. Additionally, some well-known structures or functions may not be shown or described in detail below, so as to avoid unnecessarily obscuring the relevant description.

Overview—Example Use Case

The Bluetooth® Low Energy (BLE) and other Bluetooth® protocols enable devices to recognize their relative proximity (e.g., between a mobile user device and a "beacon" device). A beacon device is a device that transmits a Bluetooth® beacon message, e.g., periodically, that a mobile device can receive and analyze. Examples of beacon messages include, e.g., an iBeacon™ message (Beacon messages may include "broadcast payloads" which can include data other than signaling or addressing). The mobile device's recognition of these beacon messages may then be used to perform various ancillary functions (e.g., notifying the user of merchandise discounts, notifying the user of an advertisement, suggesting the user share their location with peers on a social network, etc.).

For example, FIG. 1 is a block diagram illustrating an example interaction between a user device 105 and a beacon device 130 as may occur in some embodiments. The beacon device 130 may emit a series of beacon messages 135a-c on a wireless channel. The beacon messages may be emitted at regular intervals and may include information identifying the beacon device 130. These messages may be used to alert the user device 105 of the beacon device's 130 presence. As mentioned above, the user device 105 may then take an action based upon the discovery of the beacon device 130 (e.g., notifying the user that merchandise near the beacon device is offered at a discount, notifying the user of an advertisement, etc.).

In the situation 100a, the user device 105 may be too far from the beacon device 130 to receive the beacon messages, e.g., because of insufficient signal strength. When the user moves closer to the beacon device 130, e.g., as depicted in situation 100b, an application running on the user device 105 may passively receive a beacon message. As an example, a process running on the user device 105 may notify the application (e.g., via an interrupt) that a beacon message has been received. The application may transition from a passive to an active state and take action locally or cause a remote action across a network based upon receipt of the message. In the depicted example, the user device 105 has contacted a server 125 via a network 120 (e.g., the Internet). The user device may have notified the server that it was in proximity to the beacon device 130 and the server may have returned a message to display on the user device's screen 110. For example, a retailer may have placed the beacon device 130 near a discounted item in their store and configured the server 125 to inform the user of the discount 115 when the user approaches the beacon device 130.

Beacon Protocol for User Device Compatibility—Overview

While the behavior in FIG. 1 is suitable for many applications, it may be susceptible to various forms of malicious attack. For example, a malicious attacker may capture and replay the beacon messages 135a-c to impersonate the beacon device 130. For example, where proximity to the beacon device 130 is used to award the user, e.g., with a discount, the attacker may acquire the discount even when they are not in proximity to beacon device 130 by replaying the messages to their user device. Similarly, a malicious developer may design a beacon device that mimics a legitimate device to persuade a user to provide their personal information to a local system.

To prevent these attacks, an encrypted authorization may be sent from the beacon device to the mobile device. The encrypted authorization may reflect a rolling value, e.g., generated locally at the beacon device 105 or pulled by the beacon device 105 via a network connection with server 125. Where the authorization is locally generated, the process by which the authorization is locally generated may be known at the server 125 and/or at the application on the user device server 105 (e.g., the beacon device manipulates a timestamp in a known manner). Accordingly, the server 125 and/or the user device 105 can authenticate the beacon device 105, preventing replay and impersonation attacks.

Unfortunately, some operating systems, e.g., the iOS™ operating system, strip data fields in service Universally Unique Identifiers (UUIDs) from some received beacon messages (e.g., iBeacons™) before the message is passed to the application. Thus, one cannot include the encryption authorization in the data fields for these systems and be certain that the user device will have access to the data. Accordingly, some embodiments provide a beacon device design and a protocol wherein the beacon device successively transmits a first "waking" beacon message (e.g., an iBeacon™ message) and a second "data" Bluetooth® Low Energy broadcast message containing security data. The first beacon message alerts the application on the user device of the beacon device's proximity (and in some embodiments, the beacon message's identity). Once awakened by this message according to the device's operating system (e.g., iOS™, Android™, etc.) the application may then anticipate receipt of the second message. The second message may contain the encrypted authorization and any additional information (e.g., a social network page) relevant to the application. By verifying the authorization, the mobile application can confirm that the beacon device is genuine. A single chip or multiple chips may be used at the beacon device to effect the successive transmissions in a desired timing window. In some embodiments, multiple beacon messages may be sent before the Bluetooth® Low Energy broadcast message to address limitations of alternative operating systems.

Figure 2:
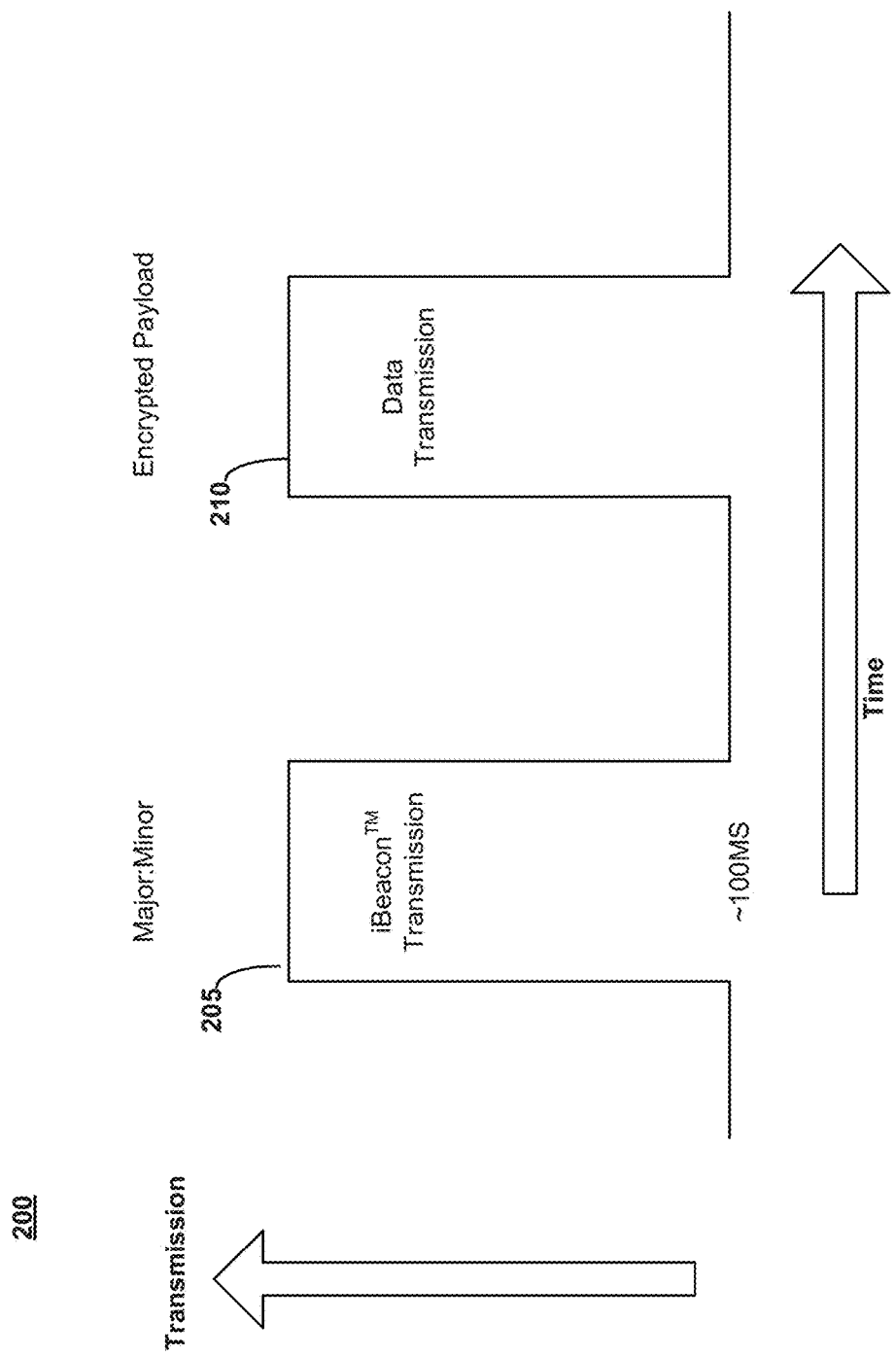
FIG. 2 is a timing diagram illustrating a wakeup message, e.g., an iBeacon™, and data transmission as implemented in some embodiments.

FIG. 2 is a timing diagram 200 illustrating a "wakeup" message, e.g., an iBeacon™ message and a "data" transmission message 210 as implemented in some embodiments. As indicated, the beacon device may first emit a "waking" message 205 lasting approximately 100 ms. Simultaneously, or a brief interval later, the beacon device may emit a data message 210 containing the data payload, which may be encrypted. This pattern may be repeated many times to contact multiple in-range devices over time and with adjustments to the messages to awaken different types of user devices.

In some embodiments, a Passive Infrared (PIR) sensor may be placed on the beacon device 130, possibly integrated with the beacon's circuitry. The PIR sensor may be used to detect whether a person is nearby (e.g., based upon the infrared emissions from the user's body) and to limit beacon transmissions until someone is within the vicinity of the beacon device. In this manner, power expenditures may be reduced at the beacon device. By employing a Fresnel lens, a range of 5-10 meters may be possible. Furthermore, the PIR sensor may be used to determine the signal range, allowing lower powered transmissions to be performed when the user is in closer proximity. If these lower power transmissions are made, the system may provide transmission power level information in the beacon message to allow the user device to calibrate the beacon device distance determination as described elsewhere herein (e.g., to recognize that the beacon device is transmitting at a lower power level rather than being farther away from the user). These embodiments may be particularly useful where the beacon device employs a finite power source, e.g., a battery. In some of these embodiments, beacons in proximity to one another (e.g., as determined by comparing Bluetooth and/or sonic transmissions between one another) may determine that they are so close as to potentially result in interference with one another's transmissions. The beacons may accordingly tune their output power and/or directionally tune their output so as not to interfere with one another (e.g., priority may be arbitrarily given to one beacon over the other or complementary patterns may be selected based upon their individual operations).

Thus, as an example, the beacon device may broadcast every 100 ms. The beacon device may check the PIR sensor during a subinterval (e.g., the last 10 ms of the 100 ms interval). If the PIR sensor detects that a person is nearby, the beacon device may refresh the broadcast interval and broadcast the beacon again in the next interval. Conversely, if the PIR sensor does not detect a person nearby during the subinterval, the beacon device may not broadcast the beacon signal. The beacon device may poll the PIR again during the next 100 ms broadcast interval to determine if someone is nearby. Naturally, the PIR sensor may be polled between beacon transmission intervals rather than during a subinterval in some embodiments.

The PIR sensor may also be used to avoid simultaneous transmissions from beacon devices competing on a same, or related, channels. For example, the PIR range may be less than the transmission range of the beacon device. Thus, if the beacon device only transmits when the PIR indicates that a user is within range, the user's device is less likely to be overwhelmed by messages from neighboring beacon devices.

Beacon Protocol for User Device Compatibility—Payload

Figure 3:
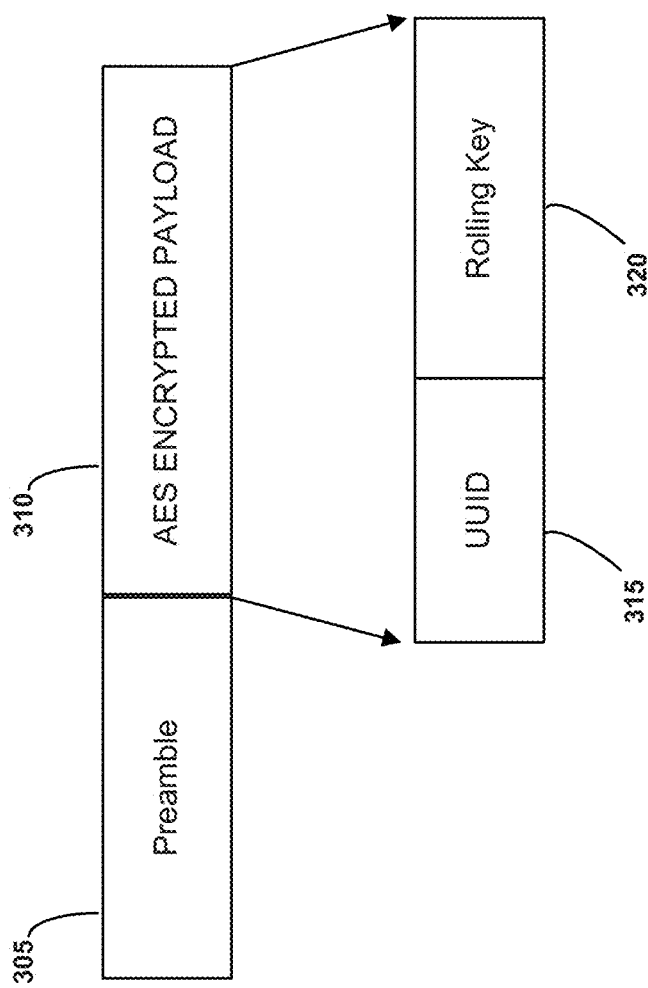
FIG. 3 is a block diagram of the data transmission payload implemented in some embodiments.

FIG. 3 is a block diagram of the data transmission payload implemented in some embodiments. This payload may appear in the data message 210. A preamble 305 may indicate that the message is a Bluetooth Low Energy broadcast message. A payload 310 may follow the preamble 305 (though not necessarily directly as indicated in this example). The payload 310 may be encrypted, e.g., with the Advanced Encryption Standard (AES).

The payload data may include a UUID 315 confirming the beacon device's identity and a rolling key 320. As discussed above, the rolling key 320 may be generated locally at the beacon device, or may be provided to the beacon device from a server. An application on the user device may use the rolling key to confirm the beacon device's authenticity. For example, a table within the application or as specified by the server may indicate the expected key based on the current time (e.g., the expected content of the encrypted payload may cycle periodically throughout the hour or based on a function receiving the current time as input). In some embodiments, a public-private key relation may also exist, where the rolling key is encrypted with a public key paired with a private key on the user device, or with a private key located on an authentication server. In this manner, the user device or authentication server may verify the authenticity of the beacon device both by decrypting the content with the private key and by verifying the authenticity of the content once decrypted. In some embodiments, certificate authorities may be used to verify the public key.

As discussed herein, the rolling key 320 may be an authentication value and may be received at the beacon device from a server (e.g., social networking server) via an application. The application receiving the authentication values could be different than the one receiving with the beacon messages (e.g., a first application may receive the authentication values and a second, independent application could obtain the values from the first application via an Application Programming Interface, etc.).

The authentication values may be in a specific sequence. The sequence may repeat over a time interval and the sequence may repeat for a number of time intervals and then change. The sequence may be specific to an entity (e.g., Starbucks™ uses a different sequence than Peets Coffee™). The sequence could be global (e.g., all beacons from one company have the same rolling sequence).

Beacon Protocol for User Device Compatibility—Transmission Patterns

Figure 4:
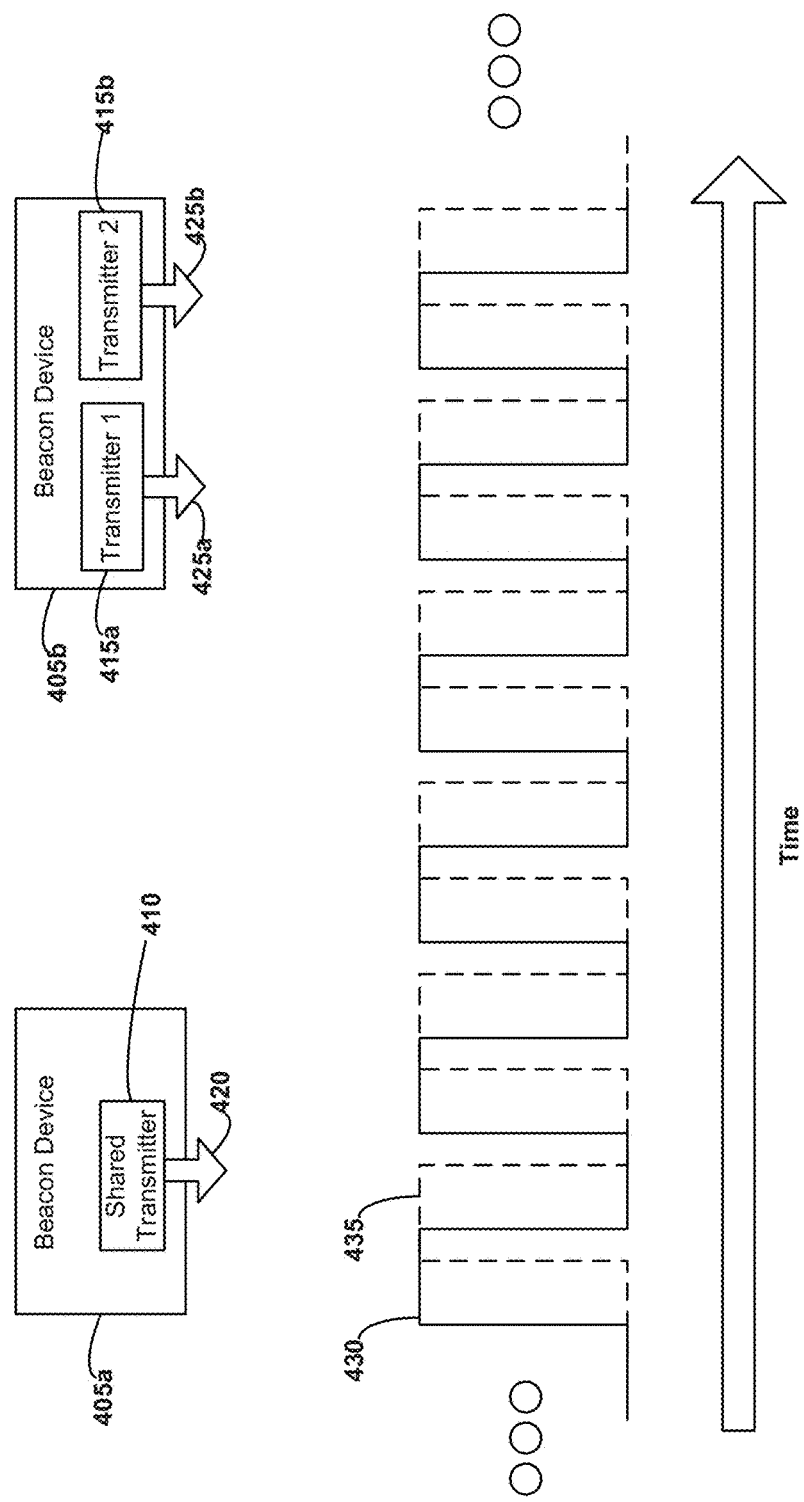
FIG. 4 is a timing diagram illustrating the relative wakeup message, e.g., an iBeacon™, and data transmission periods as may occur in some embodiments.

FIG. 4 is a timing diagram illustrating the relative wakeup message, e.g., an iBeacon™, and data transmission periods as may occur in some embodiments. In some beacon devices, e.g., beacon device 405*a*, a single transmitter 410 may be used to transmit 420 both the iBeacon™ 430 wakeup and the subsequent data signal 435 (which may or may not overlap as indicated in this timing diagram). Conversely, in some implementations of the beacon device, e.g., beacon device 405*b*, there may be separate transmitters 415*a*, 415*b* that transmit 425*a* the iBeacon™ 430 and transmit 425*b* the data message signal 435 separately.

Figure 5:
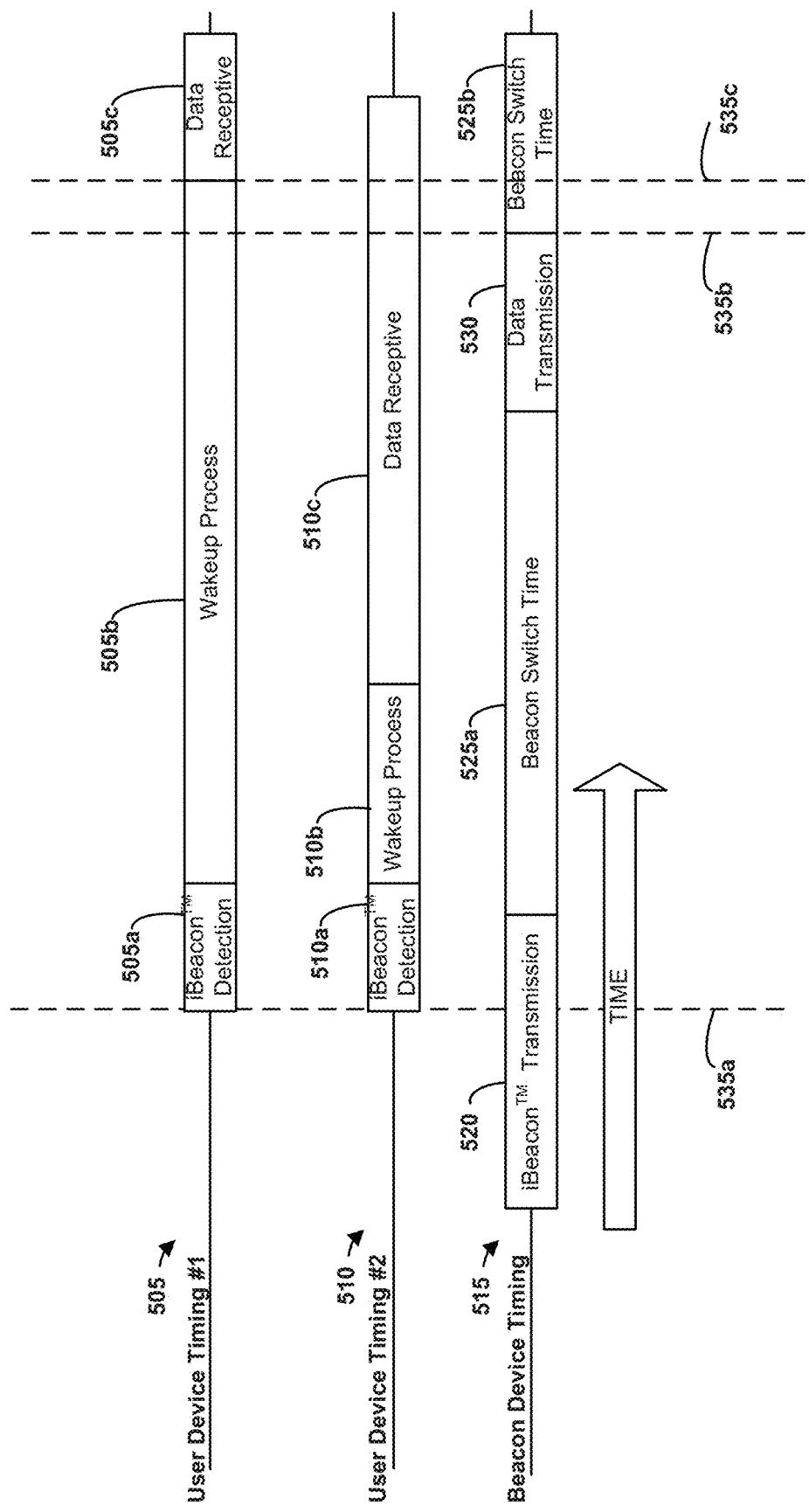
FIG. 5 is a block timing diagram illustrating the relative transmission and reception events as may occur in some embodiments.

Beacon Protocol for User Device Compatibility—Beacon Device Design and Transmitter Timing FIG. 5 is a block timing diagram illustrating the relative transmission and reception events as may occur in some embodiments. Timeline 515 indicates the behavior at the beacon device. Timeline 505 indicates the operations at a user device according to one possible timing behavior. Timeline 510 indicates the operations at a user device according to another possible timing behavior.

The beacon device may have a single transmitter as in device 410. In this situation, there may be a switch time delay 525*a* after transmission of the iBeacon™ signal 520 before transmission of the data signal 530 may occur (the delay may occur periodically, e.g., appearing again at time 525*b*). For example, the beacon system may need to decouple the beacon signal generating components from the transmitter and couple the data transmitting components. The duration of this switch time delay interval 525*a,b* may be anticipated in some embodiments. For example, the beacon system may be designed so as to anticipate the reception behavior of the user devices (conversely, applications on the user devices may be designed to accommodate the limitations of the beacon device).

As an example of the relevant timing considerations, timeline 505 indicates the relevant behavior at one example user device. Following detection at time 535*a* there may be an initial delay 505*a* as the user device recognizes the presence of the iBeacon™. The detection may initiate a "wakeup" process 505*b*. For example, one application thread may listen for the iBeacon™. Following receipt of the iBeacon™, this thread may spawn a second thread to receive the BLE data transmission at the receptive period 505*c*. In this example, because the wakeup process has taken too long, there is a gap between the end 535*b* of the data transmission and the beginning of the user device's receptivity 535*c* for the timing diagram 505.

Accordingly, the beacon device's intervals and/or the user device application's intervals may be designed to avoid such interactions. For example, in the second example timeline 510, the user device is able to receive the data transmission in interval 510*c* because the wakeup process 510*b* is shorter (e.g., maybe both threads were already running and 510*b* merely reflects the time to switch between threads and notify the second thread of the beacon message's arrival). This is true even though the detection interval 510*a* is the same length as detection interval 505*a*.

Figure 6:
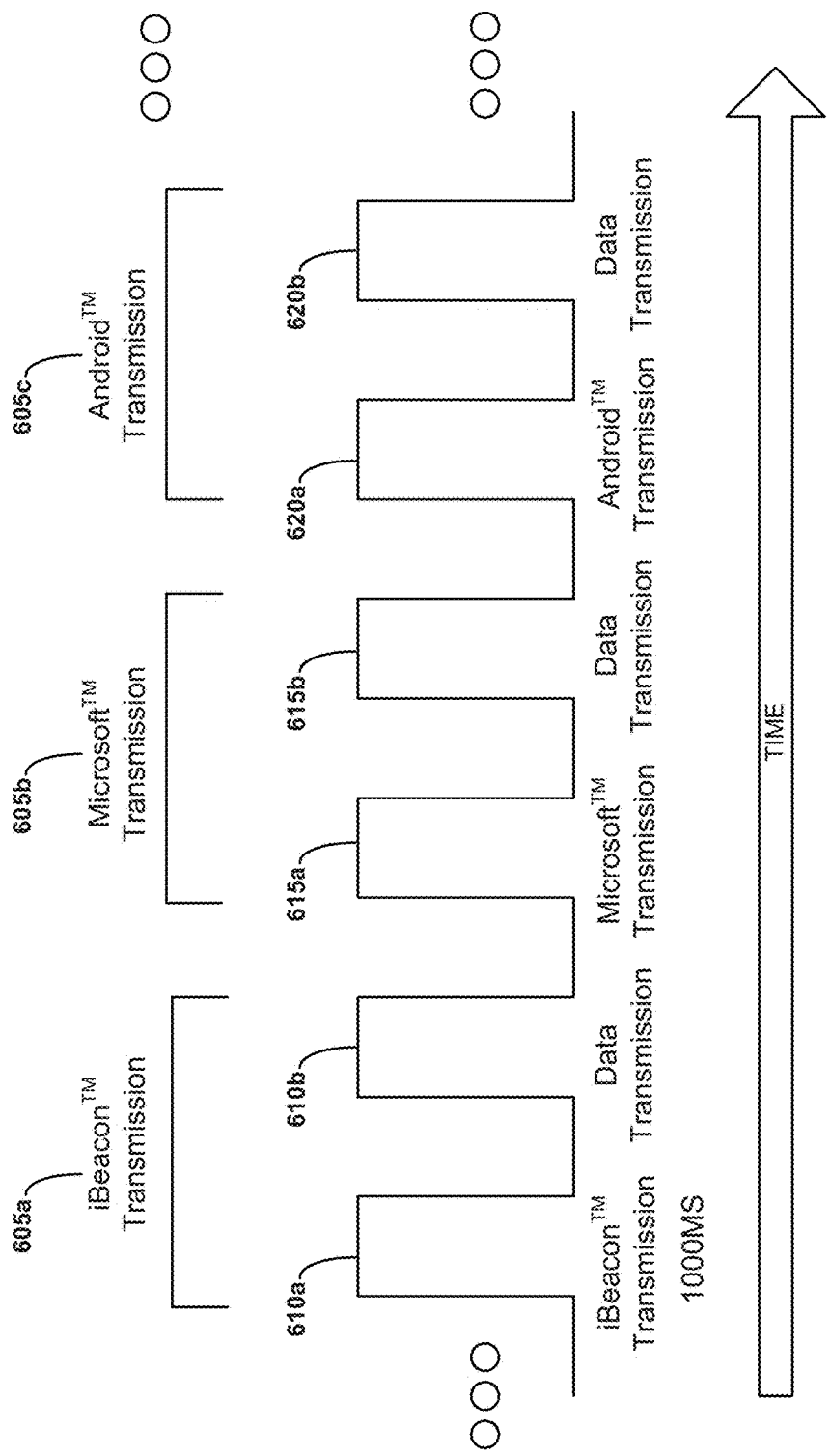
FIG. 6 is a timing diagram illustrating multiple transmissions for different recipient restrictions as may occur in some embodiments.

Beacon Protocol for User Device Compatibility—Multiple Compatibility Transmissions FIG. 6 is a timing diagram illustrating multiple transmissions for different recipient restrictions as may occur in some embodiments. While one will recognize that for purposes of explanation portions of this disclosure have focused on compensation for the behavior of the iBeacon™ message in conjunction with the iOS® system, one will recognize that an analogous process may be applied mutatis mutandis for other operating systems' behaviors. As different user device operating systems may have different beacon message restrictions (e.g., each having their own protocols and limitations on data fields) some embodiments cycle transmission of the beacon message/data message pairs to accommodate each of the different device types. For example, after transmitting an iBeacon™ 605*a* pair of beacon 610*a* and data messages 610*b*, the system may then transmit beacons specific to different manufacturers and developers, e.g., Microsoft® 605*b* Windows Mobile™ and Google Android® 605*c* pairs of beacon 615*a*, 620*a* and data 615*b*, 620*b* messages. While the beacon message transmissions 610*a*, 615*a*, 620*a* may vary with each beacon protocol, the data transmissions 610*b*, 615*b*, 620*b* may be the same in some embodiments.

Figure 7:
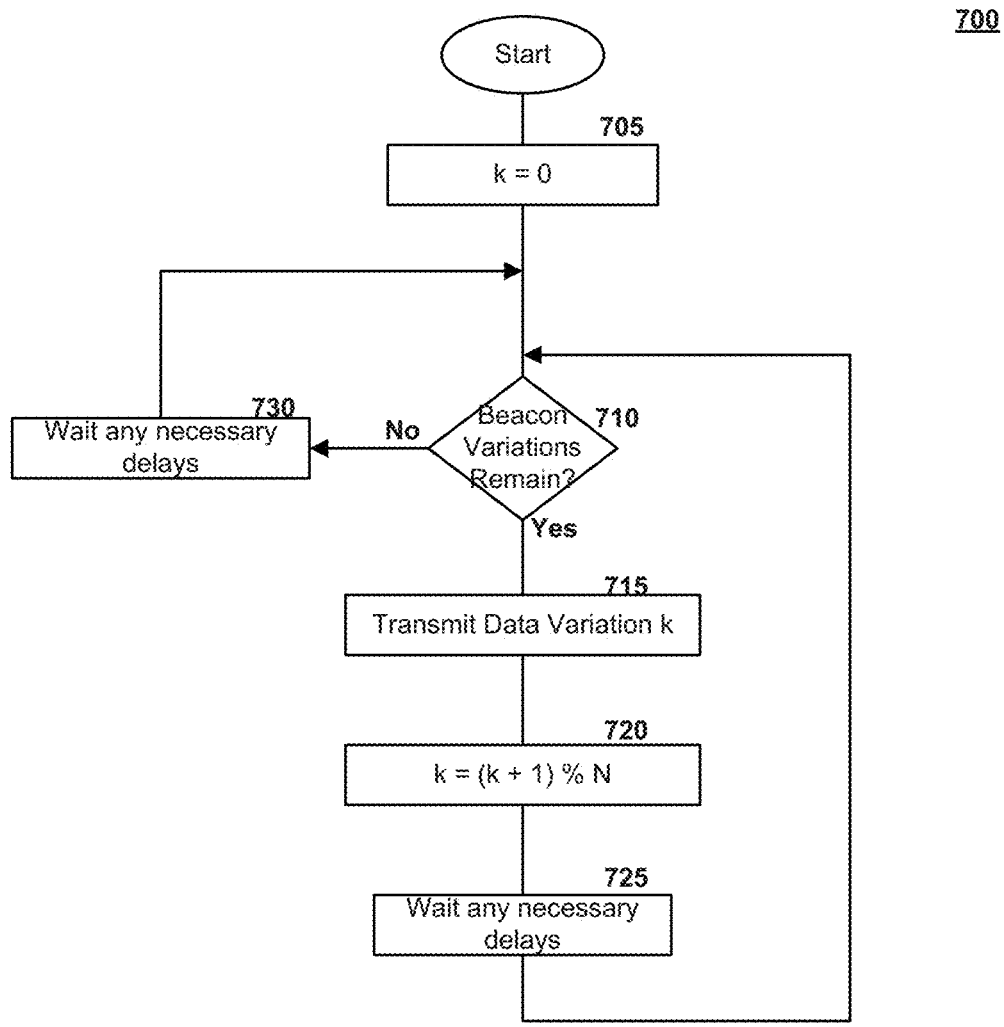
FIG. 7 is a flow diagram illustrating a process to provide multiple transmissions for different recipient restrictions as may occur in some embodiments.

FIG. 7 is a flow diagram illustrating a process to provide multiple transmissions for different recipient restrictions as may occur in some embodiments. In this example, the system may consider transmitting N different beacon message variations in succession with each repetition. For purposes of explanation, one could consider that a counter k is initialized to 0 at block 705. At block 710, the system may consider if beacon message variations have not yet been transmitted. For example, none of the beacon messages have yet been transmitted in this iteration and so the system may continue to block 715, where the kth beacon message is transmitted (e.g., where k=0, the iBeacon™ pair of beacon 610*a* and data messages 610*b*). At block, 720 the counter may be incremented. If a delay is necessary, e.g., to avoid congestion on the transmission channel, the beacon device may wait at block 725 until the next transmission may be performed. Within each repetition, each of the beacon variations (iBeacon™ 605*a*, Microsoft® 605*b*, Google Android® 605*c*, etc.) may be successively transmitted (e.g., for each increment of k), including the respective beacon message and data transmission. When k again equals 0, and no variations remain, the system may wait any necessary delay sat block 730 before transmitting the next succession of beacon message and data pairs.

Beacon Device Triangulation—Overview

In some embodiments, beacon devices transmit beacon messages to alert an application on a mobile user device (e.g., a mobile phone) of the beacon device's proximity. A Received Signal Strength Indication (RSSI) field may indicate the power level at which the beacon message was received at the mobile device. Where the transmission power of the beacon device is standardized (e.g., it's agreed upon in advance that the beacon device will transmit at a particular power level), the application can infer the distance from the beacon device based upon the RSSI field (in some embodiments, a transmission and receipt timestamp may also be used to corroborate the inferred distance determination). By considering successive RSSI values over time while the mobile device is in motion, in conjunction with position information (e.g., GPS information) for the mobile device, the location of the beacon device relative to the mobile device may be inferred. Similarly, where multiple mobile devices simultaneously receive beacon messages, the beacon device position may be inferred by triangulating each of the mobile devices' GPS and RSSI values. Moving and/or stationary beacon devices may be detected in this manner using moving and/or stationary mobile devices.

Figure 8:
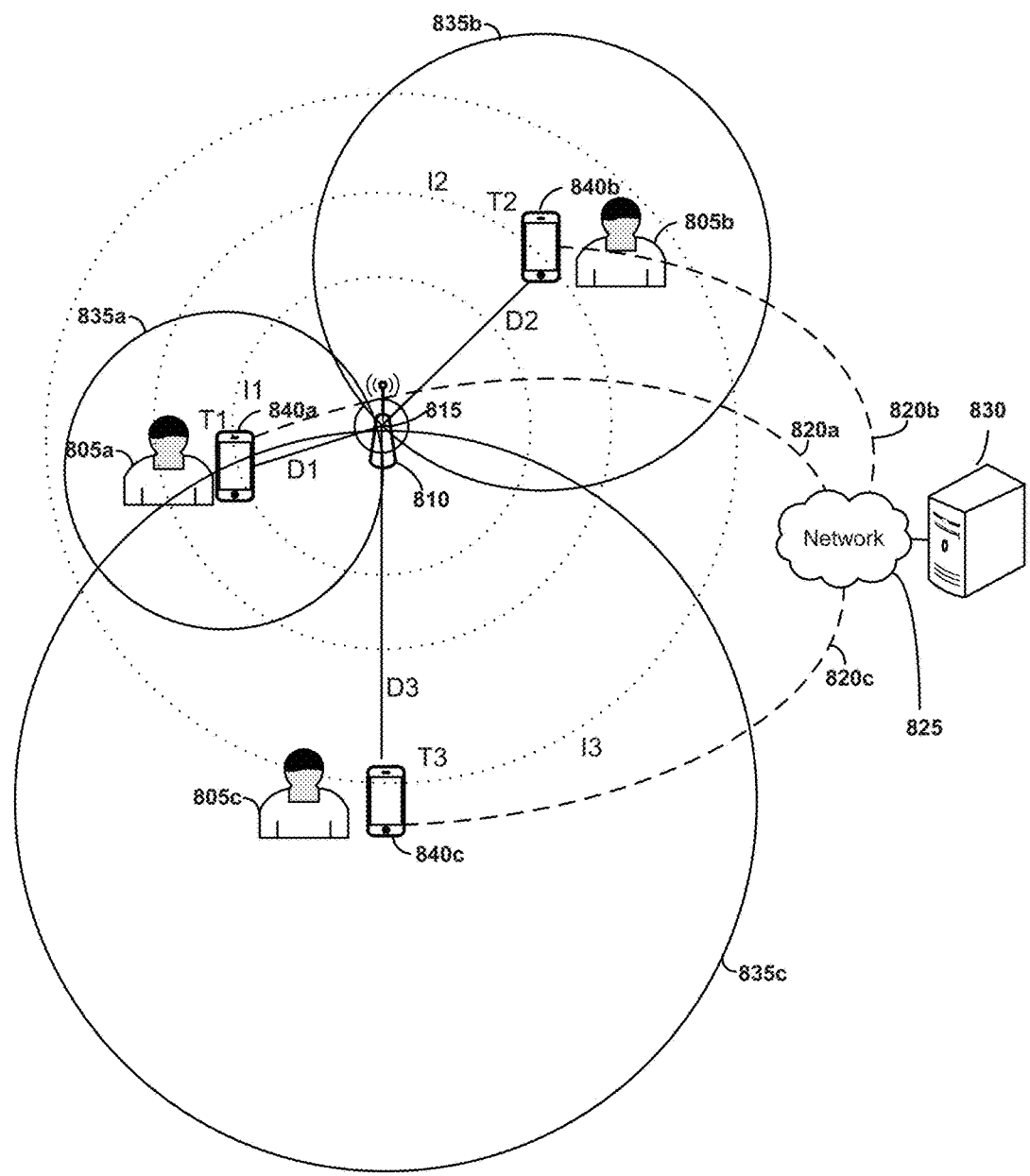
FIG. 8 is a block diagram illustrating beacon device triangulation using three user positions as may occur in some embodiments.

FIG. 8 is a block diagram illustrating beacon device triangulation using three user positions as may occur in some embodiments. A server 830 and/or one or more user devices 840a-c may track beacon readings from one or more devices at substantially the same instance in time or across multiple times. For example a plurality of user devices 840a-c may report their beacon measurements to the server 830 across network 820a-c (e.g., the Internet) via connections 820a-c. In some embodiments, user devices 840a-c may be the same device and the measurements may be reported sequentially in time to the server 830. In some embodiments, rather than reporting the measurements to the server 830 the user devices may retain the measurements locally or share them with one another.

Based on these shared measurements, the one or more user devices 840a-c and/or the server 830 may infer the position coordinates 810 of beacon device 815. For example, a measurement may be taken at position 805a, a measurement at position 805b, and a measurement at position 805c. Position 805a may be a distance D1 from the beacon device 815, position 805b may be a distance D2 from the beacon device 815, and position 805c may be a distance D3 from the beacon device 815. Similarly, the beacon messages may be received at times T1, T2, and T3 for each of positions 805a-c. In some embodiments the timestamps and/or the RSSI level of the beacon message may be used to infer distance. In isolation, it is unclear where along each of circles 835a-c the beacon device is located for the measurements taken at each of the positions 805a-c. With two measurements, e.g., those taken at positions 805a and 805b, there would then be only two possible locations at which the beacon device 815 was situated (i.e., the two intersections of the circles 835a and 835b). The third measurement at position 805c may be used to resolve the ambiguity, as only one of the two possible position intersections of the circles 835a and 835b also intersects the circle 835c (i.e., the intersection at position 810). Though depicted here using three circles to facilitate understanding in the two-dimensional plane of the page, one will recognize that four devices may be used to locate a beacon in the three-dimensional space of the real-world (e.g., while three devices may suffice when the user devices are in the same plane as the beacon device, four user devices may accommodate, e.g., differences in elevation).

Beacon Device Triangulation—Triangulation Process

Figure 9:
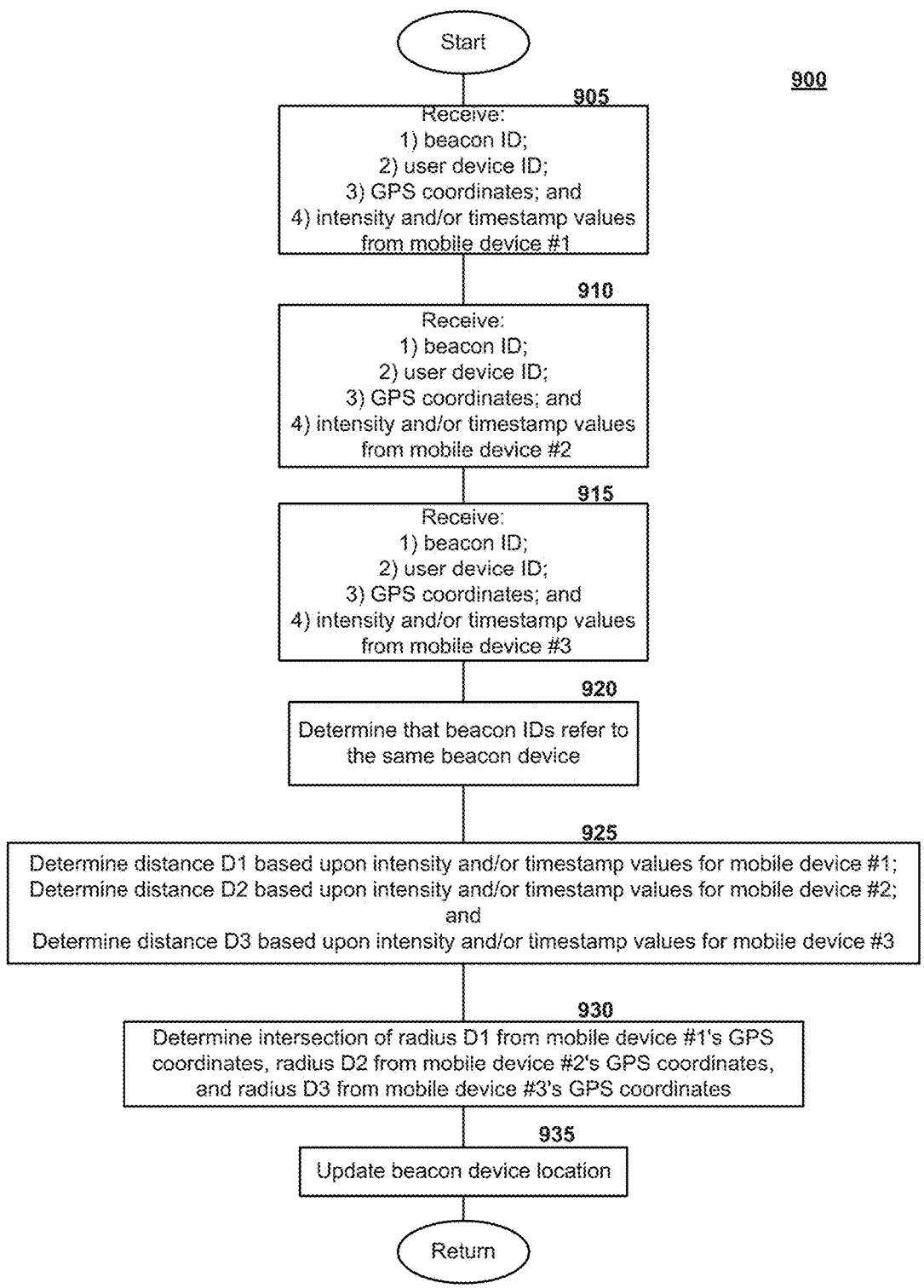
FIG. 9 is a flow diagram illustrating a process for triangulating a beacon device position using beacon measurements at multiple user positions as may occur in some embodiments.

FIG. 9 is a flow diagram illustrating a process 900 for triangulating a beacon device position using beacon measurements at multiple user position measurements as may occur in some embodiments. At block 905, the system, e.g., a mobile device or a network server, may receive beacon measurement data from a first mobile device. The data may be recorded for future reference. At blocks 910 and 915 second and third sets of beacon measurement data may be received. The new measurement data may be from the same or different mobile devices and may be from measurements at substantially the same time or over a period of time. The messages may include the identifier of the beacon device from which the message was received, the GPS coordinates of the user device at the time of the measurement, and the power intensity and/or timestamp values associated with the message. The beacon message may include, e.g., a timestamp indicating the time of transmission from the beacon device and the mobile device may include a time of receipt with the beacon measurement data message. Thus, the messages received at blocks 905, 910, and 915 may include this transmission time as well as the time at which the beacon message was received at the user device. In some embodiments, the distance between the beacon device and user device may be inferred by dividing the difference between the times by the speed of the message (e.g., the speed of the radiation). This determination may be corroborated (or vice versa) with a determination based upon the RSSI power level at receipt.

At block 920 the system may determine that the beacon IDs identified in the messages correspond to a same beacon device. For example, every time a message is received, the system may search past messages, e.g., in a SQL table, to identify corresponding measurements (from the same or different user devices).

When three measurements corresponding to a same beacon device have been acquired at three different user device positions, the system may seek to update the beacon device's position. For example, at block 925, the system may determine the distances from each of the user device positions to the beacon device based upon the timestamps and/or power level values. With these distances and the user device positions, at block 930 the system may determine the intersection of circles about each user device position, with a radii of the circles corresponding to the associated determined distances. At block 935, this intersecting point may be recorded as the position of the beacon device.

One will recognize variations in the above description. For example, the user devices may determine the distance to the beacon device themselves based upon the timestamps/power levels and may transmit this distance information in the messages, rather than the raw measurement values.

Beacon Device Triangulation—Triangulation Techniques

Figure 10:
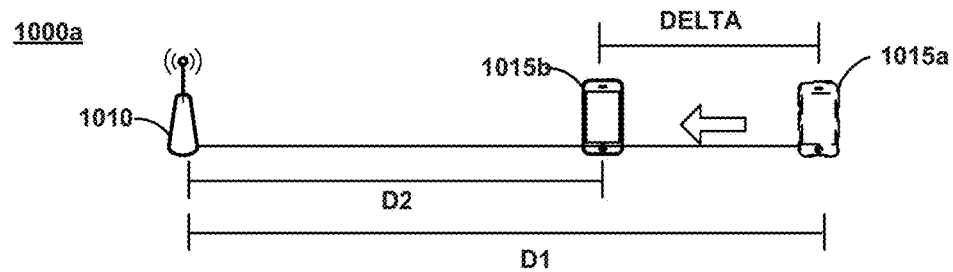
FIG. 10 is a schematic diagram illustrating the relative positioning of a beacon device and a user device to infer positions via various techniques as may occur in some embodiments.
Figure 10:
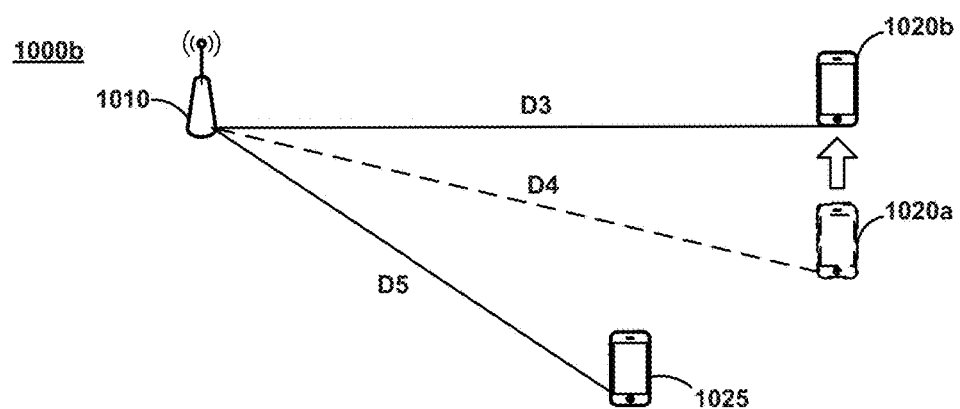
Figure 10:
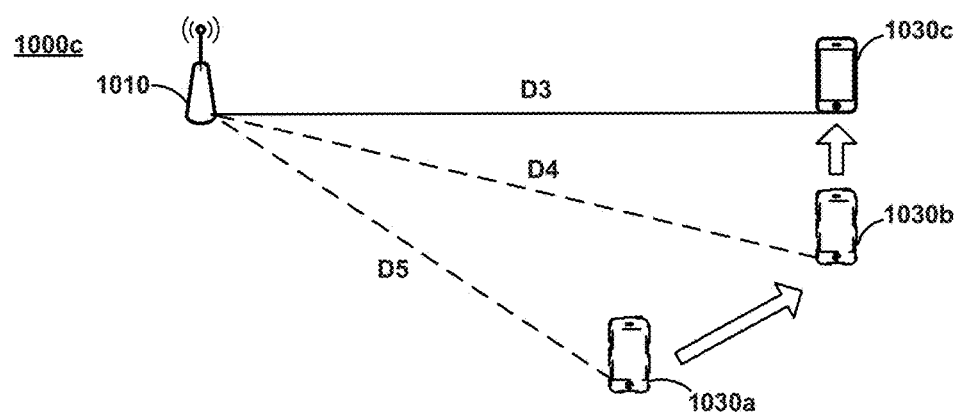

FIG. 10 is a schematic diagram illustrating the relative positioning of a beacon device and a user device to infer positions via various techniques as may occur in some embodiments. In some embodiments, the system may be optimized to infer beacon positions with less than three distinct position measurements. For example, in situation 1000a, the system may recognize that a user device has moved from a first position 1015a to a second position 1015b distance DELTA away. As the direction of motion is directly toward the beacon device 1010, the difference between distances D1 and D2 will be the same as DELTA. In this situation, where the difference in distances to the beacon device 1010 is substantially the same as the distance traveled by the user device, the system may infer that the user device is moving in a straight line to the beacon device any may accordingly forego waiting for one or more additional measurements before making a determination (or may use this knowledge to inform a selection of a potential position based on previous triangulation data).

Similarly, in situation 1000*b*, the system may triangulate a beacon device's 1010 position by inferring measurements from two or more devices. For example, a first device may sense the beacon device at a position 1025 a distance D5 from the beacon device. A second device may make a first measurement at position 1020*a* at a distance D4 from the beacon device and may subsequently make a measurement at position 1020*b* at a distance D3 from the beacon device. The system may aggregate these temporal/spatial measurements, and assuming the beacon device 1010 is stationary, perform a triangulation assessment.

Rather than use multiple devices, a single device may be used in the situation 1000*c*. In this situation, a single device moves from positions 1030*a*, 1030*b*, and 1030*c*. The system may aggregate these temporal/spatial measurements, and assuming the beacon device 1010 is stationary, perform a triangulation assessment using the temporally disparate distance/position pairs. Thus, the messages in blocks 905, 910, and 915 may be from a single user device at different times, multiple devices at the same time, but different positions, etc.

Figure 11:
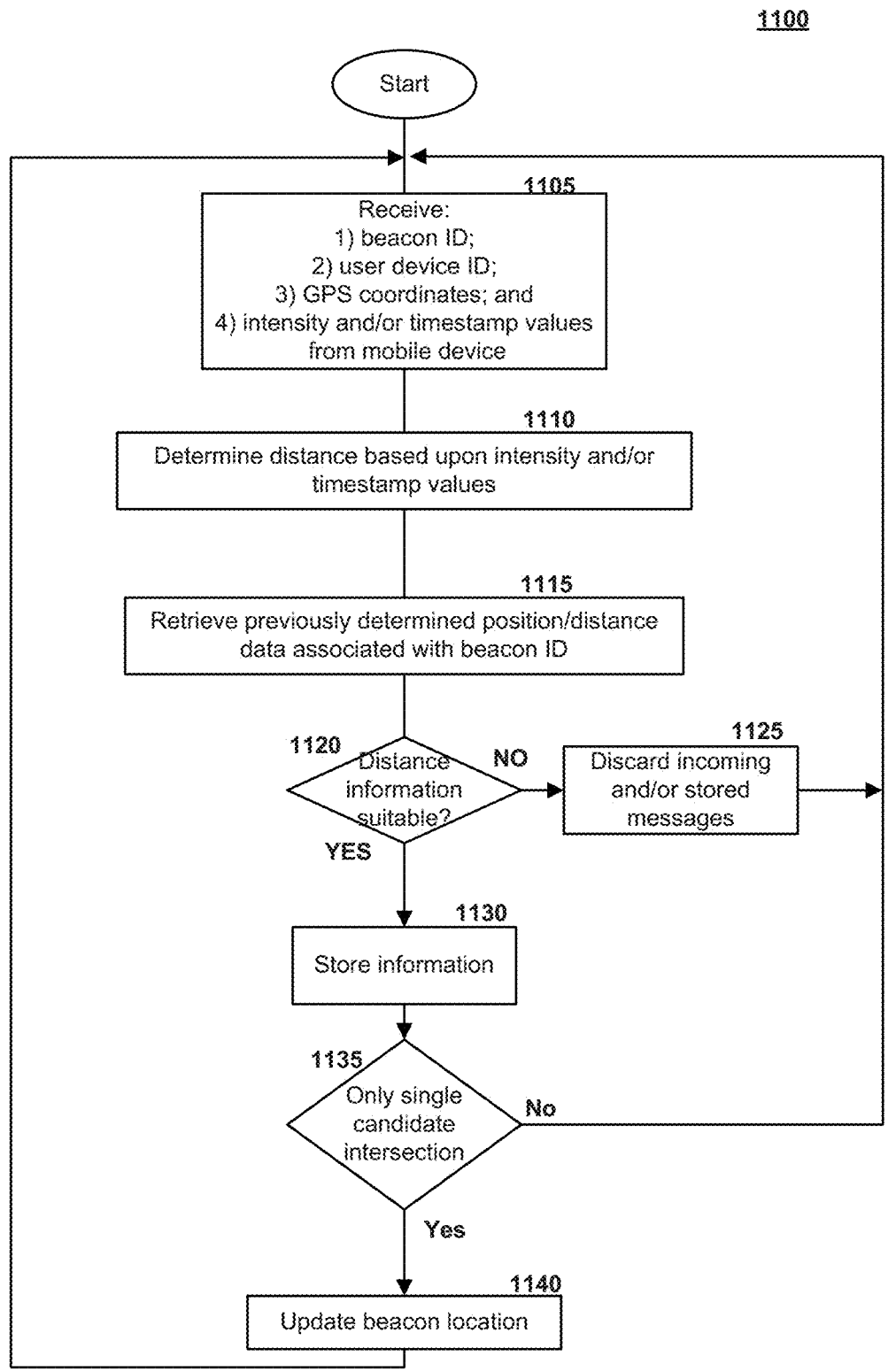
FIG. 11 is a flow diagram illustrating a process for triangulating a beacon position using multiple user positions as may occur in some embodiments.

FIG. 11 is a flow diagram illustrating a process for triangulating a beacon position using multiple user positions as may occur in some embodiments. At block 1105, the system (which, as discussed above, may be a user device, a network server, etc.) may receive a reporting message indicating a beacon device ID; GPS coordinates of the measuring device, and an indication of distance, e.g., in the form of a received power and/or timestamp associated with the received beacon message. Though receipt of a single message is depicted here, one will recognize that messages may be batch transmitted in some embodiments.

At block 1110, the system may determine the distance from the beacon device to the user device based upon the timestamps and/or power intensity. At block 1115, the system may retrieve previously processed position/distance data associated with the beacon ID.

At block 1120, the system may determine whether the distance information is suitable. For example, as mentioned herein, differences in elevation may result in two measurements presenting different distances from a beacon device. If these measurements were assumed to lie in the same plane, then an erroneous position for the beacon device may be determined. Accordingly, at block 1120, the system may compare the incoming measurement with past measurements. If elevation data is included in the position measurements, then the system may normalize the distance data to a common elevation (and accordingly accept all the normalized data as suitable). Alternatively, if the GPS data includes three dimensions, the system may identify the intersections of spheres about each user device position (e.g., having a radius of the reported distance and center at the user device position). Where elevation data is not present, however, the system may instead identify user devices presenting measurements substantially affected by elevation and may exclude the measurements so affected. For example, if the difference in the two-dimensional position coordinates between two user device beacon message measurements is only very slight, but the distance to the beacon device changes dramatically, the system may infer that at least one of the user devices is located on a steep incline. If the data cannot be normalized for triangulation, at block 1125, the system may discard the messages taken from disparately elevated locations.

At block 1130, the system may store the newly received distance/pair relation, e.g., associating the pair with the beacon device and user device IDs in a database.

At block 1135, the system may determine whether the distance/position pairs corresponding to the beacon device ID indicate only a single candidate position. If a single position has not yet been resolved (e.g., where there are only two suitable distance/position pairs, presenting two candidate beacon device positions) the system may wait for additional messages resolving the ambiguity. Once the ambiguity is resolved, at block 1140, the beacon device location may be updated in the database and/or appropriate responsive action taken (e.g., notifying a user of the beacon device's location).

In some embodiments, the received messages may be associated with a receipt timestamp. After a period of time, the message data may be considered "stale" and removed from the database. In this manner, the beacon device position may regularly be updated using fresh data. One will recognize additional variations, e.g., where the updated position is taken as an average of multiple determinations, as a Bayesian inference based upon the quality and quantity of past measurements, etc.

Beacon Device Triangulation—Power Attenuation

Figure 12:
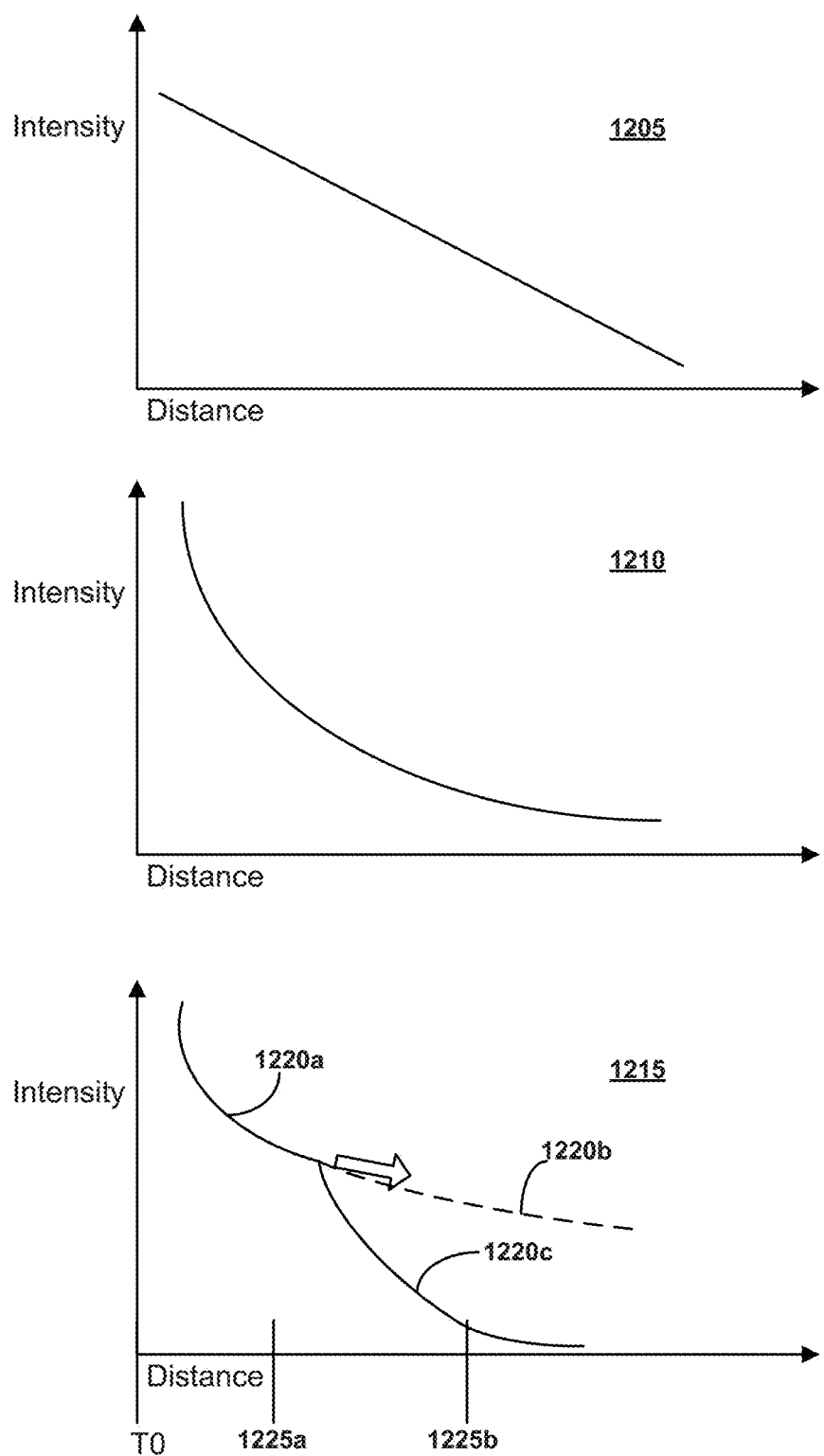
FIG. 12 is a series of plots illustrating beacon message power reception intensity as a function of distance between the user device and the beacon device as may occur in various embodiments.

FIG. 12 is a series of plots illustrating beacon message power reception intensity as a function of distance between the user device and the beacon device as may occur in various embodiments. While disparate elevations may result in some messages being normalized or discarded, additional factors may also result in the distance data being adjusted or discarded. For example, if an intervening object has delayed or attenuated the beacon message that the data can no longer be relied upon, the system in some embodiments will detect the interference and refer to other measurements.

Plot 1205 depicts an idealized relation between the received intensity of a beacon message at a user device and the distance of the user device from the beacon device. Generally, given an isotropically distributed beacon message transmission, the intensity will decay with distance from the beacon device. Plot 1210 depicts a more realistic relation, involving a convex distribution (although the distribution may be concave in some situations).

Where there is an interfering medium between the user device and the beacon device the distortion may manifest itself as a deviation from an idealized power distribution. For example, the user device may expect a distribution 1220*a* that continues along a path 1220*b*. However, an interfering medium may cause the decay to transition instead to a profile 1220*c*. A measurement at distance 1225*b* may accordingly indicate a much lower power intensity than expected. Absent additional knowledge, the system may infer that the user device is at a distance much further from the beacon device than is actually the case. Accordingly, in some embodiments, the power intensity may be corroborated with timestamp information (e.g., time of transmission indicated in the beacon message and time of receipt at the user device). If the distance indicated by the timestamp differs considerably from that indicated by the power distribution the system may infer the presence of an interfering medium and discard the data. The timestamp need not be as accurate for this purpose as it would be if being used to actually perform the distance assessment.

Beacon Device Triangulation—Beacon Device Motion

Figure 13:
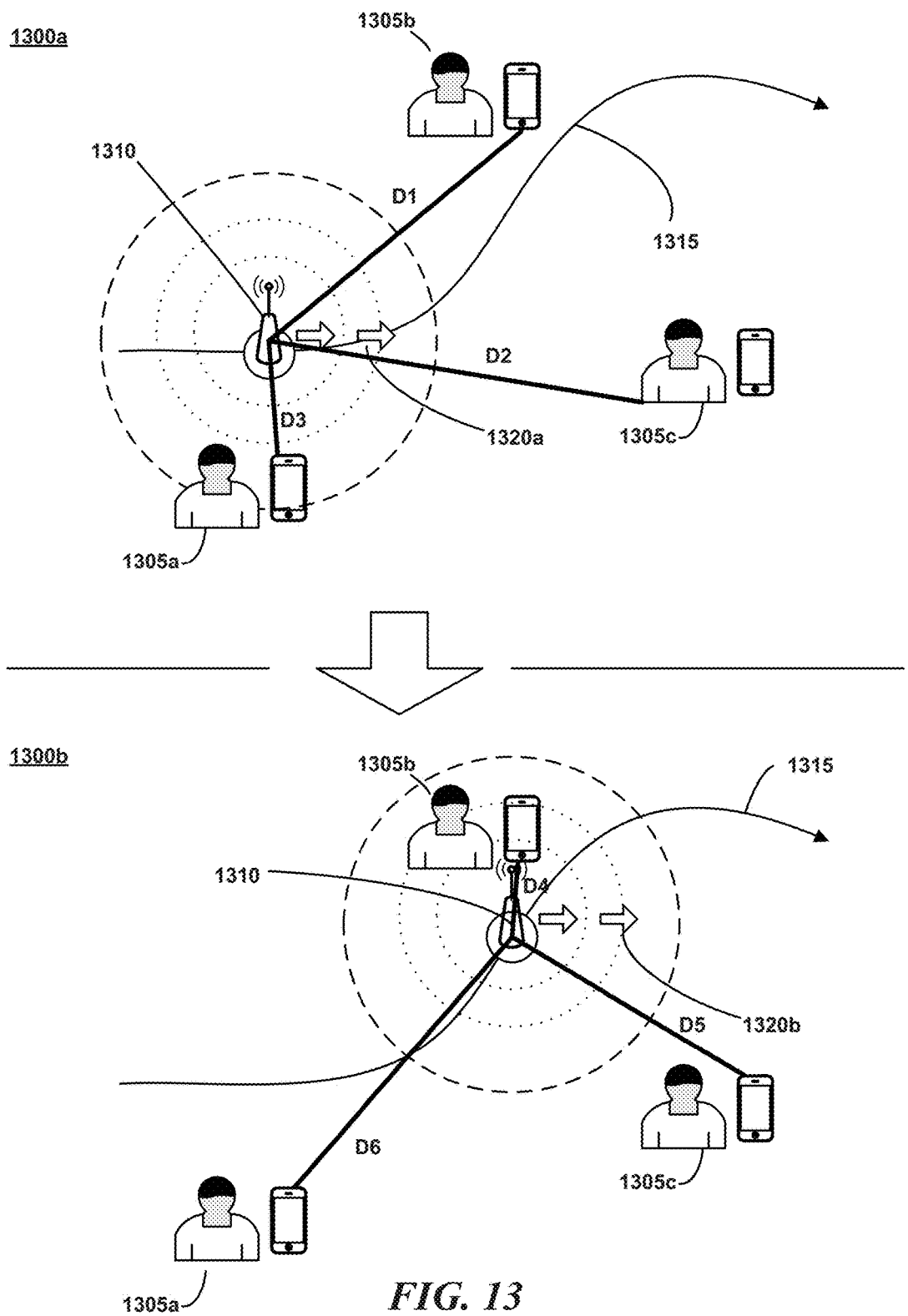
FIG. 13 is a schematic diagram illustrating an example of a moving beacon and its measurement at one or more user device locations as may occur in some embodiments.

While many of the embodiments discussed herein contemplate determining the location of a fixed beacon device, some embodiments instead locate a moving beacon, or at least make a determination that the beacon is not stationary. FIG. 13 is a schematic diagram illustrating an example of a moving beacon and its measurement at one or more user device locations as may occur in some embodiments. A plurality of user devices 1305*a-c* may receive messages propagating 1320*a,b* from a beacon device 1310 as the beacon device 1310 travels along a trajectory 1315 (e.g., the beacon device may be attached to a dog collar, car, purse, etc.). Accordingly, distance determinations D1-D3 may be made at time 1300*a* and distance determinations D4-D6 may be made at time 1300*b* for each of the respective devices. Various of the disclosed embodiments present systems and methods for distinguishing between moving user devices and/or moving beacon devices.

Beacon Device Triangulation—Beacon Device Emission Periods and Movement

Figure 14:
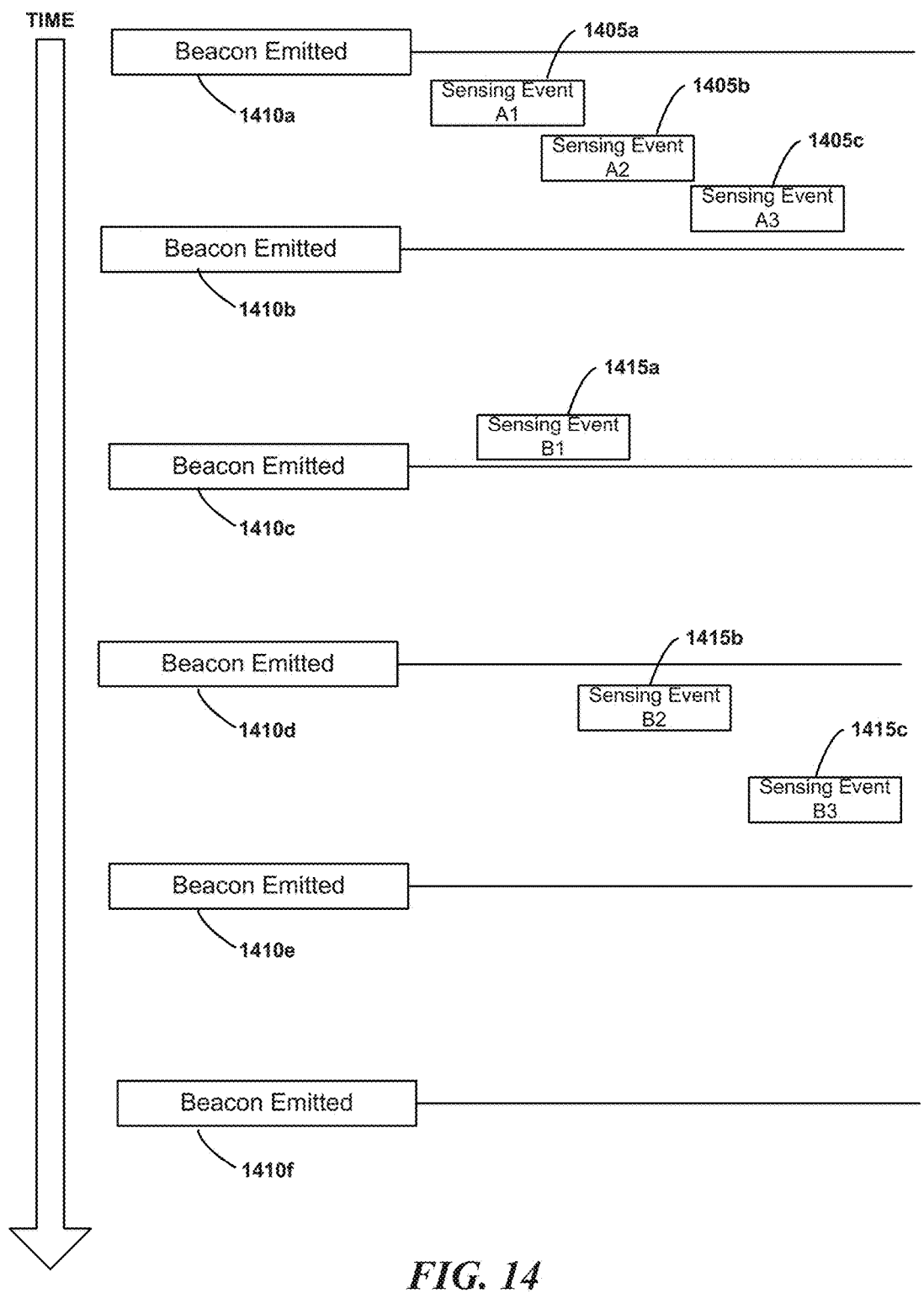
FIG. 14 is a time plot diagram illustrating an example of sensing events at a user device relative to the beacon message emission periods of a beacon device as may occur in some embodiments.

FIG. 14 is a time plot diagram illustrating an example of sensing events at a user device relative to the beacon message emission periods of a beacon device as may occur in some embodiments. The system may be able to infer the position of a moving beacon device if the received data is correlated with a same beacon message. For example, in FIG. 14 depicts sensing events 1405*a-c*. A sensing event may correspond to the receipt of a beacon message at, e.g., one of user devices 1305*a-c*. Here, event 1405*a* reflects the receipt at a first user device, event 1405*b* the receipt slightly later in time at a second user device (e.g., the second being further form the beacon device than the first user device), and event 1405*c* the receipt at a third user device. As these events have occurred within a single beacon message interval between beacon message emissions 1410*a* and 1410*b*, the system may have confidence that the sensing events relate to a same transmission (and accordingly, the same position of the beacon device when the transmission was made).

In contrast, sensing events 1415*a-c* do not all fall within the same period. Accordingly, the system may defer a determination of the beacon device's position if attempting a triangulation using this data. Particularly, the position of the beacon device during the transmission associated with sensing event 1415*a* is not necessarily the same as that associated with events 1415*b* and 1415*c*. A determination with this data may result in an improper triangulation assessment. Thus, the system may consider the periodicity of beacon message transmissions from the beacon device when determining which datasets to use for the position determination.

Figure 15:
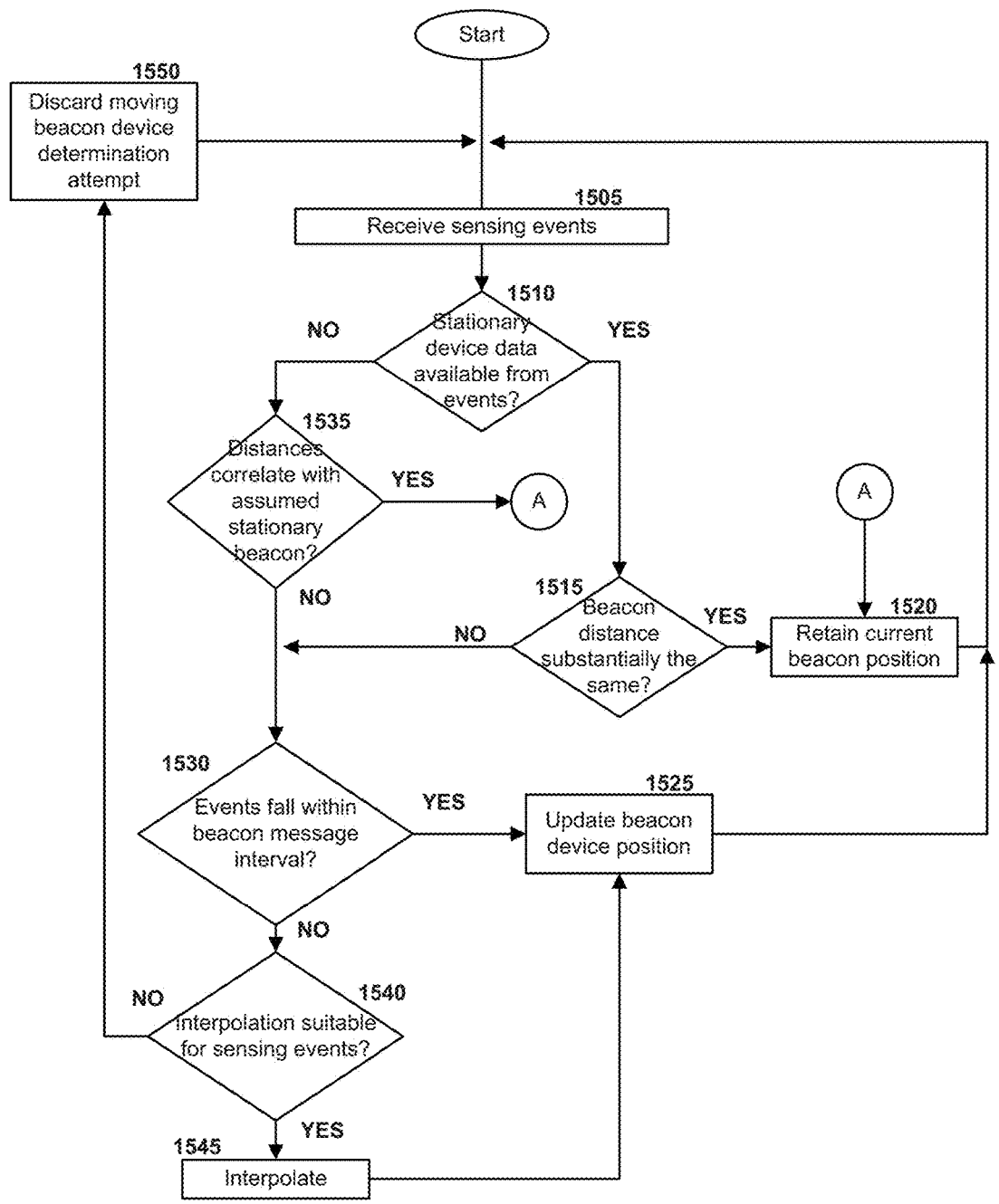
FIG. 15 is a flow diagram illustrating the detection of a moving beacon device as may occur in some embodiments.

FIG. 15 is a flow diagram illustrating the detection of a moving beacon device as may occur in some embodiments. In some embodiments, the system may attempt to update the beacon's position as it moves over time. At block 1505, the system may receive a sufficient number of sensing events from the user devices with which to perform a triangulation determination.

At block 1510, the system may determine if the data reflects stationary user device data. For example, the system may verify that the GPS data associated with a user device has not changed since a past sensing event was received. If the user devices appear to be stationary, then at block 1515 the system may determine if the distance between each user device and the beacon device is substantially the same since the last measurement. If so, the previously determined beacon device position may be retained at 1520 (as the beacon device has not moved). Conversely, if the distances have changed at block 1515, this will indicate that the beacon device is moving and that the new position should be determined. At block 1530, the system may determine if the events are associated with the same beacon transmission (e.g., that they fall within the same beacon interval as discussed with respect to FIG. 14). If so, then the system may update the beacon position at block 1525 using, e.g., the triangulation methods described herein, such as those in FIGS. 9 and 11.

Returning to block 1510, if the user devices were not stationary, then at block 1535 the system may determine whether the varying distances correspond to a stationary beacon device position. For example, if only one user device has moved and its position is now a distance D from the previously determined position of the beacon device, and it's measured distance is now D, then the system may infer that the beacon device has not moved since the last determination and may transition to block 1520.

Conversely, where the user devices are not stationary and/or the beacon device is not stationary, then at block 1530 the system may determine whether the presently considered sensing events fall within a same beacon interval. If the events do not fall within the same interval, then in some embodiments the system may determine at block 1540 whether interpolation is suitable. For example, where the beacon device has not moved, but one of the user devices has moved, the system may interpolate the position of the user device between the beacon intervals to determine suitable values to use with the other sensing events residing in a same interval. Where such interpolation is expected to provide adequate results, the interpolation may be performed at block 1545, before updating the beacon device position at block 1525.

Where interpolation will not suffice, or be possible, then at block 1550 the system may give up the attempt and may wait for more suitable data. In some embodiments, where an attempt fails, the system may present users with a projected value of the beacon device's position based, e.g., on past successful position and velocity determinations.

Beacon Message Pattern Security—Overview

Some embodiments contemplate a beacon device configured to transmit a pattern of successive beacon messages and/or Bluetooth Low Energy broadcast messages at one or more different power levels. The pattern of power levels may serve multiple functions. First, in some embodiments the pattern level may securely identify the beacon device. The mobile phone application may confirm with a network server (or locally) that the pattern agrees with the beacon device's identity (e.g., by applying a public/private key pair, verifying that a sequence of values match, etc.). Second, in some embodiments the pattern may also serve a calibration function. Based on the pattern, the mobile device may be able to infer the values at which transmissions are made by the beacon device (and consequently the distance associated with the power level at which a message has been received at the user device). Once the mobile device has determined the power at which the messages were transmitted, the mobile device can infer from weaker received power levels that the beacon device is further from the mobile device. The weaker power levels may also indicate the character of the transmission environment as discussed herein.

Figure 16:
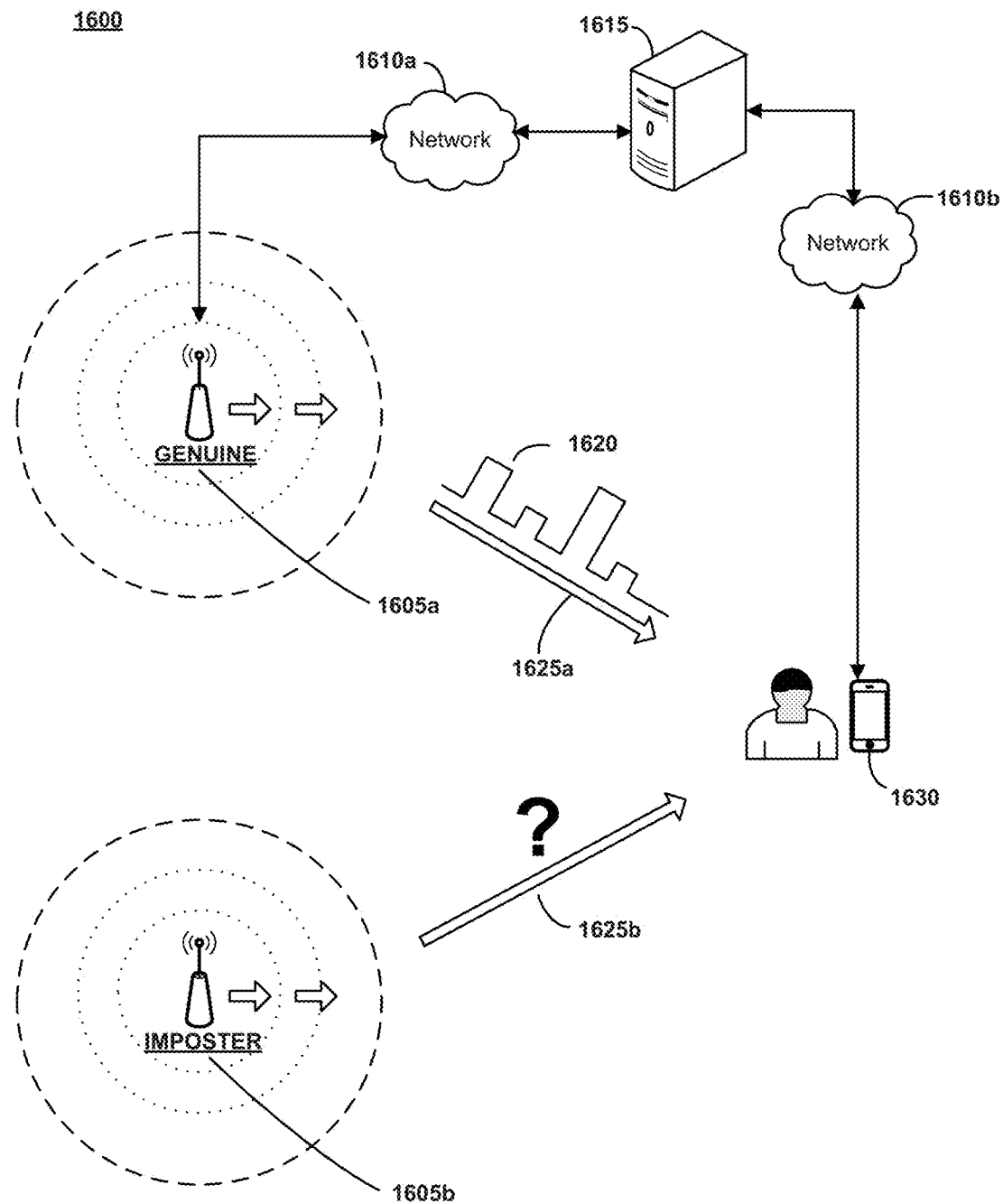
FIG. 16 is a block diagram illustrating example user device interactions with an imposter beacon device and a genuine beacon device implementing pattern security as may occur in some embodiments.

FIG. 16 is a block diagram illustrating example user device interactions with an imposter beacon device 1605*b* and a genuine beacon device 1605*a* implementing pattern security as may occur in some embodiments. A user device 1630 may receive beacons 1625*a* and 1625*b* from each of a genuine 1605*a* and imposter 1605*b* beacon device. However, the genuine beacon device 1605*a* may be in communication with a server 1615 via network 1610*a* (or in some embodiments may have a locally stored reference) which provides a time-varying pattern of values. The genuine beacon device 1605*a* may transmit the beacon messages at varying power levels 1620 in accordance with this security pattern. The user device 1630 may authenticate this pattern with server 1615 via a network 1610*b* (possible the same as network 1610*a*, e.g., the Internet). In some embodiments, an application on the user device may instead have access to a local reference indicating the correct security pattern. By comparing the received pattern of power levels 1620 with the expected pattern at the user device 1630, the user may authenticate and distinguish the genuine beacon device 1605*a* from the imposter 1605*b*.

As discussed herein, the authentication values may be received at the beacon device from a server (e.g., social networking server) via an application. The application receiving the authentication values could be different than the one receiving with the beacon messages (e.g., a first application may receive the authentication values and a second, independent application could obtain the values from the first application via an Application Programming Interface, etc.).

The authentication values may be in a specific sequence. The sequence may repeat over a time interval and the sequence may repeat for a number of time intervals and then change. The sequence may be specific to an entity (e.g., Starbucks™ uses a different sequence than Peets Coffee™). The sequence could be global (e.g., all beacons from one company have the same rolling sequence). These features of the receipt and variation in the authentication values from the server may apply to the Pattern Security transmissions discussed herein as well as to the encrypted payload in the wakeup message discussed above.

Beacon Message Pattern Security—Attenuation

Figure 17:
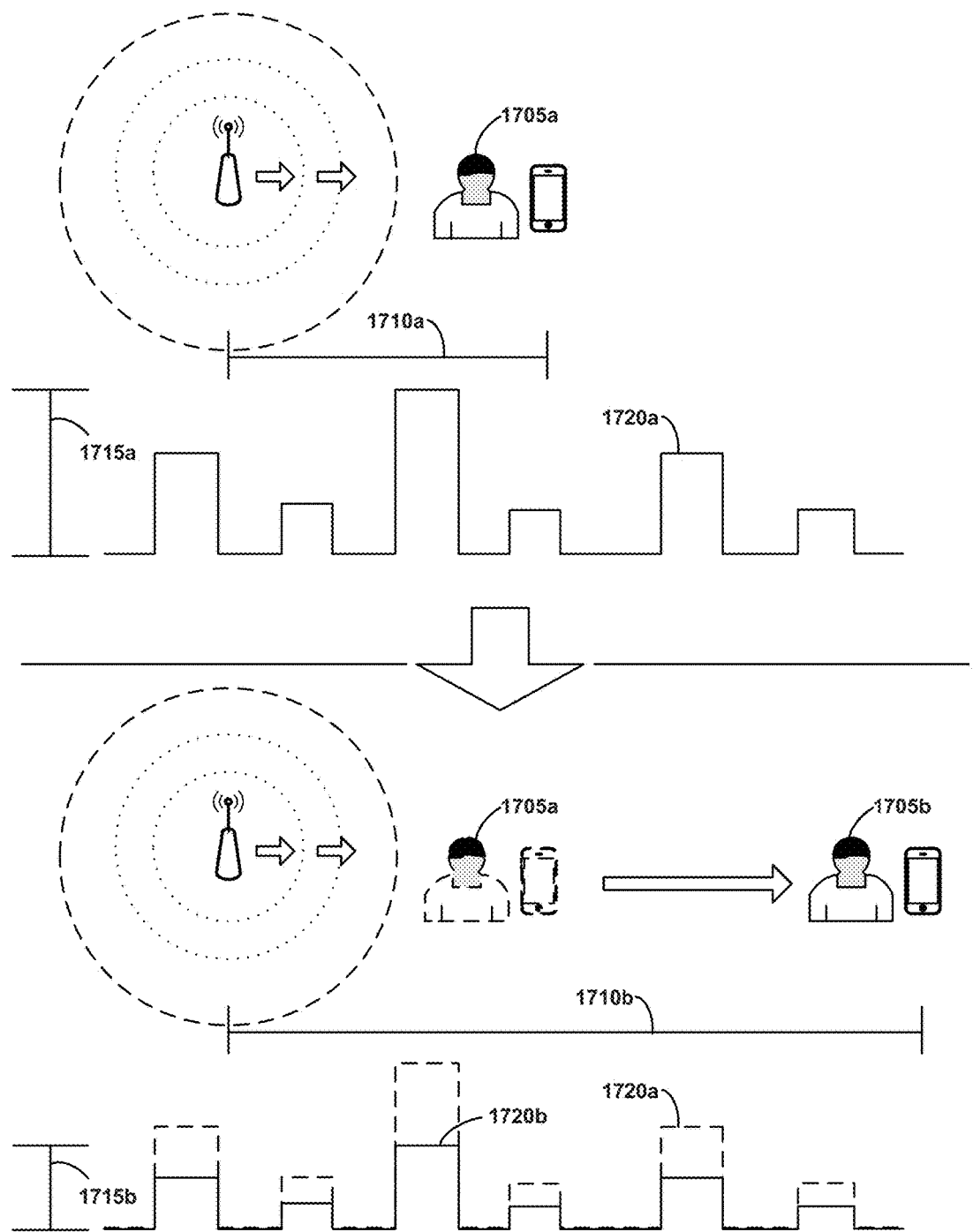
FIG. 17 is a schematic diagram illustrating attenuation of the power-based security pattern with distance as may occur in some embodiments.

FIG. 17 is a schematic diagram illustrating attenuation of the power-based security pattern with distance as may occur in some embodiments. As discussed herein, the power intensity at which beacon messages are received is inversely proportional to the distance between the beacon device and user device. Accordingly, a user device at a first position 1705*a* a first distance 1710*a* from a beacon device may experience a pattern of beacon message power levels 1720*a* within a range 1715*a*. When the user device moves a further distance 1710*b* from the beacon device to a second position 1705*b*, the range may be attenuated to smaller value 1715*a* and the power pattern 1720*b* scaled accordingly. Thus, the user device may need to sample a sufficient number of beacon messages to infer the relevant range (and consequently the corresponding quantized intensity values).

Beacon Message Pattern Security—Analysis—Quantization

Figure 18:
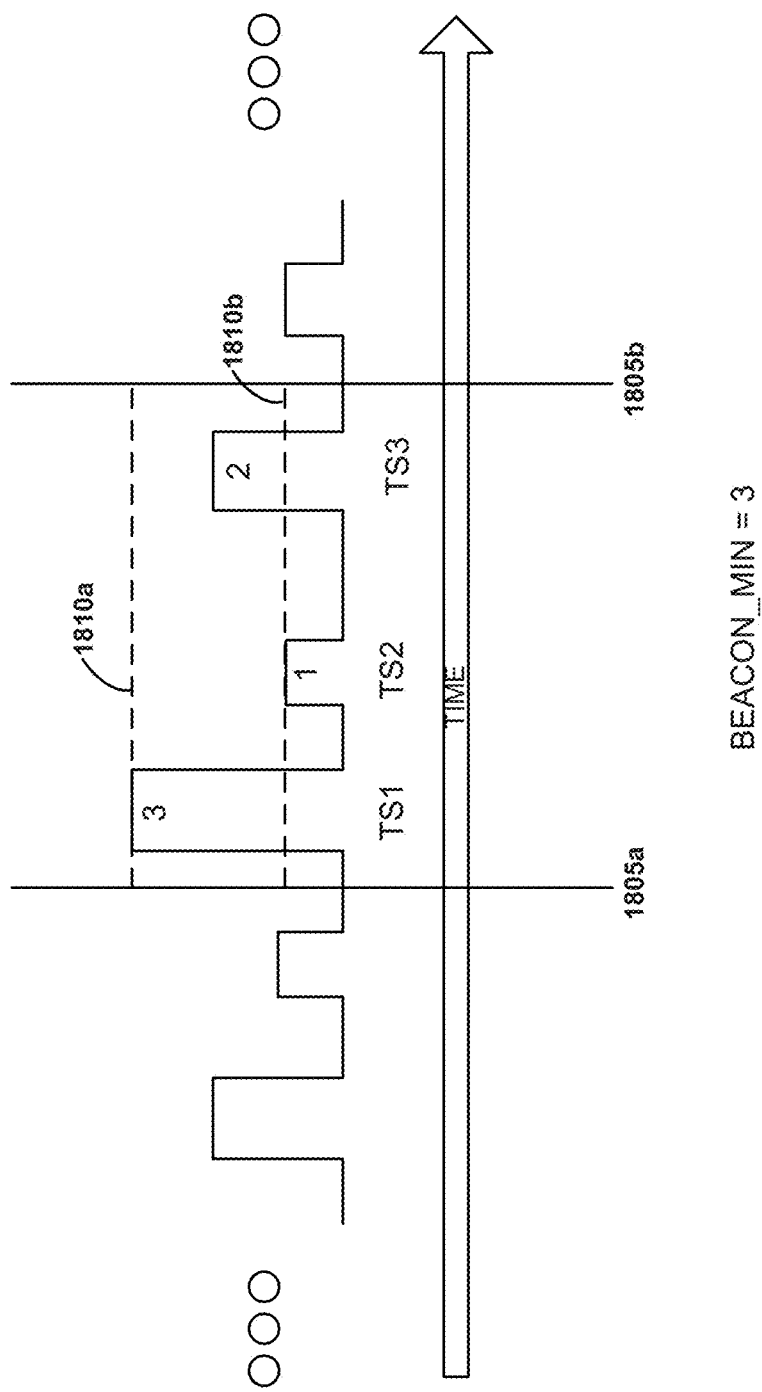
FIG. 18 is a time plot illustrating quantization assessments within a beacon window as may occur in some embodiments.

FIG. 18 is a time plot illustrating quantization assessments within a beacon window as may occur in some embodiments. In some embodiments, the pattern security protocol may specify that for each fixed number of beacon message transmissions "BEACON_MIN", a message will be transmitted at a maximum and a minimum ranged power value. The system may use then use these maximum and/or minimum values to quantize the security pattern (though maximums and minimums are referenced here for explanation, one will recognize that other references may be used for quantization based upon the protocol). For example, in FIG. 18 BEACON_MIN=3. Accordingly, the user device can be assured that if it samples at least three beacon messages in succession, it may infer the minimum and maximum power intensity values. For example, in the region between times 1805*a* and 1805*b* the transmission associated with timestamp TS1 may receive a quantized value of 3, the transmission associated with timestamp TS2 may receive a quantized value of 1, and the transmission associated with timestamp TS3 may receive a quantized value of 2. These quantized values may be assigned after considering the minimum 1810*b* and/or maximum 1810*a* intensity values occurring among the BEACON_MIN beacon messages.

As depicted in FIG. 17, each beacon's received power intensity scales proportionally because the user device remains stationary. Accordingly, BEACON_MIN may dictate the minimum number of beacons for which the user device and/or beacon is to remain stationary (such that the power level scales proportionately for all the beacons as a consequence of the initial transmission power, rather than as a consequence of the distance between the devices). In some embodiments, movement may be allowed, e.g., if the power intensity distribution is as shown in FIG. 12, and the beacon power intensities can be normalized at different distances from the beacon device. In this manner, the quantization and transmitted pattern may still be determined.

Beacon Message Pattern Security—Analysis—Distance

Figure 19:
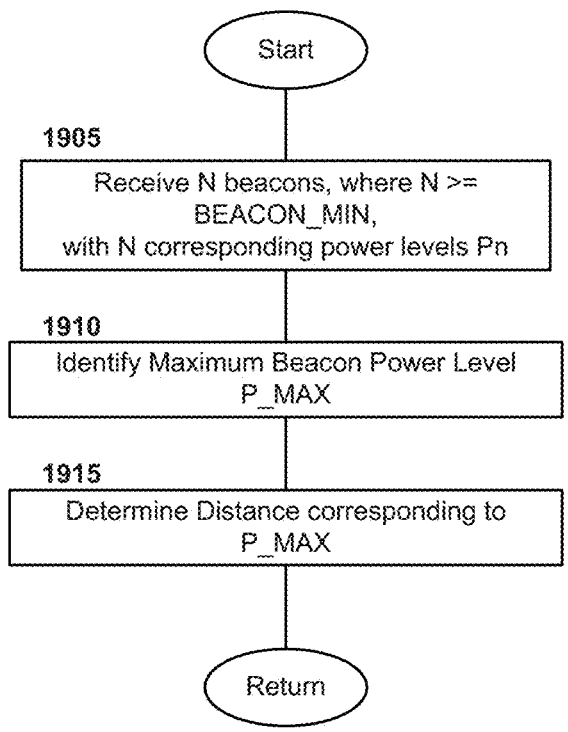
FIG. 19 is a flow diagram illustrating a process for determining a distance between the user device and the beacon device based upon the attenuation of the power-based security pattern as may occur in some embodiments.

FIG. 19 is a flow diagram illustrating a process for determining a distance between the user device and the beacon device based upon the attenuation of the power-based security pattern as may occur in some embodiments. At block 1905, the system may receive a number N of beacons greater than or equal to BEACON_MIN. From this corpus the system may identify a maximum power value at block 1910 and a corresponding distance at block 1915 (e.g., using a power intensity distribution as shown in FIG. 12). In this example, the user device uses an intensity distribution associated with the maximum power transmission level to infer distance, but one will recognize that other values may instead be used from the sampled beacons (e.g., the minimum or an intermediate value). In this manner, by inferring and calibrating based upon a maximum level, the system can determine the distance to the beacon device.

Beacon Message Pattern Security—Analysis—Processing

Figure 20:
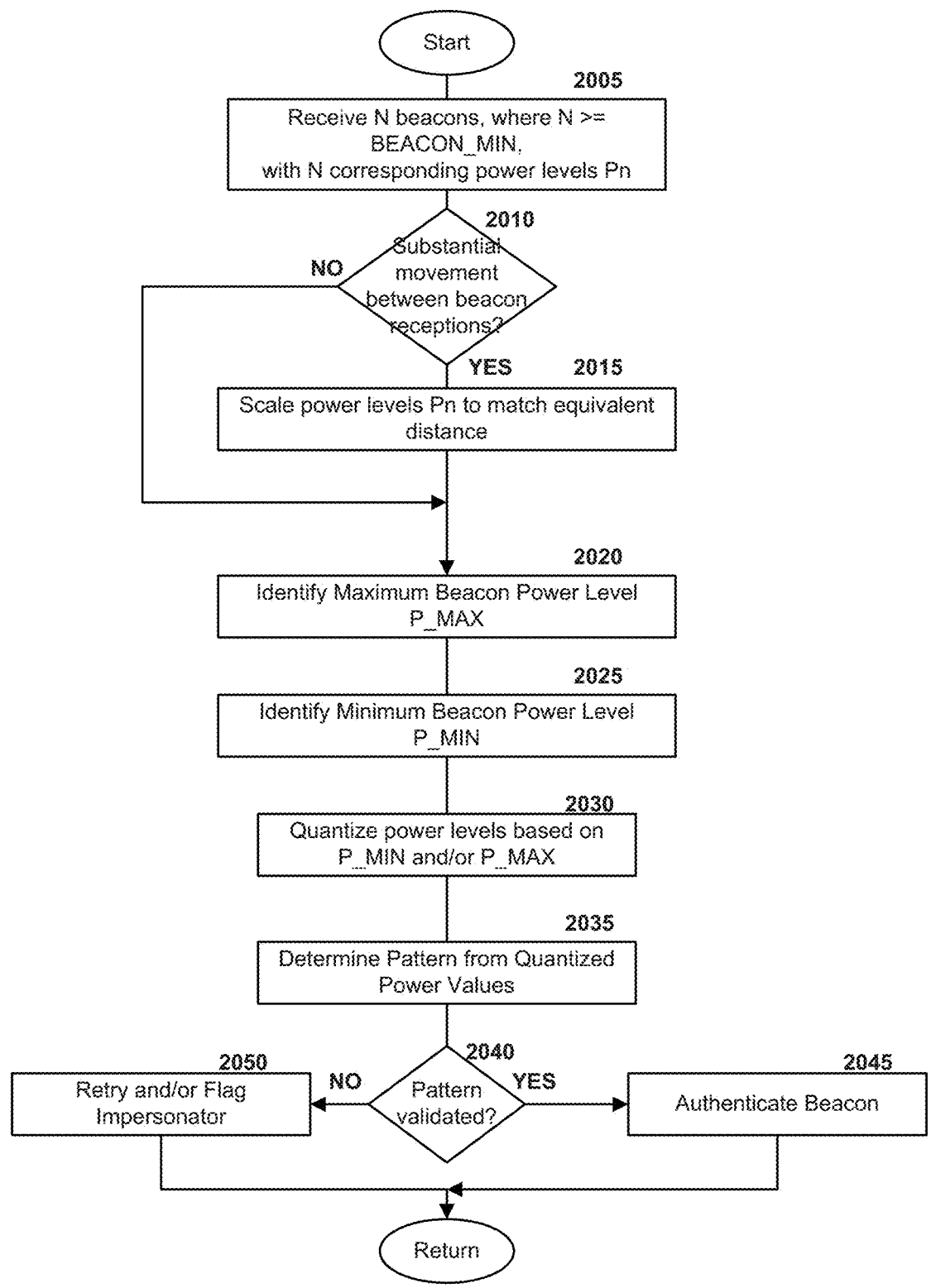
FIG. 20 is a flow diagram illustrating a process securely processing beacon device information using a security pattern as may occur in some embodiments.

FIG. 20 is a flow diagram illustrating a process securely processing beacon device information using a security pattern as may occur in some embodiments. At block 2005, the system may receive a number in beacons in excess of the agreed BEACON_MIN. At block 2010, the system may determine if the user moved substantially while the beacons were received (e.g., that the user device was moved sufficiently relative to the beacon device to affect the power intensity scaling). In some embodiments, the beacon device rather than the user device may have moved. If such a movement occurred, then at block 2015 the system may scale, and thereby normalize, the received power intensity levels associated with each beacon message.

At block 2020, the system may identify the maximum power intensity at which a beacon message from the corpus was received. At block 2025, the system may identify the minimum power intensity at which a beacon message from the corpus was received. As discussed above, only one of the maximum or minimum may be determined in some embodiments. Other values (e.g., the median) may also be used for quantization depending upon the agreements of the protocol.

At block 2030, the system may quantize the beacon message power intensities. For example, the system may associate an integer value with each of the intensity levels. In this manner, the system may compare the pattern with a secure sequence of numbers. At block 2035, the system may identify the integer pattern in these quantized values.

If the determined pattern agrees with the expected pattern at block 2040 the system may authenticate the beacon device at block 2045, or otherwise proceed as though the beacon device were genuine. Alternatively, if the patterns do not match (exactly or within an allowed degree of error), then at block 2050 the system may attempt to reauthenticate the beacon device and/or flag the beacon device as an impersonator.

Figure 21:
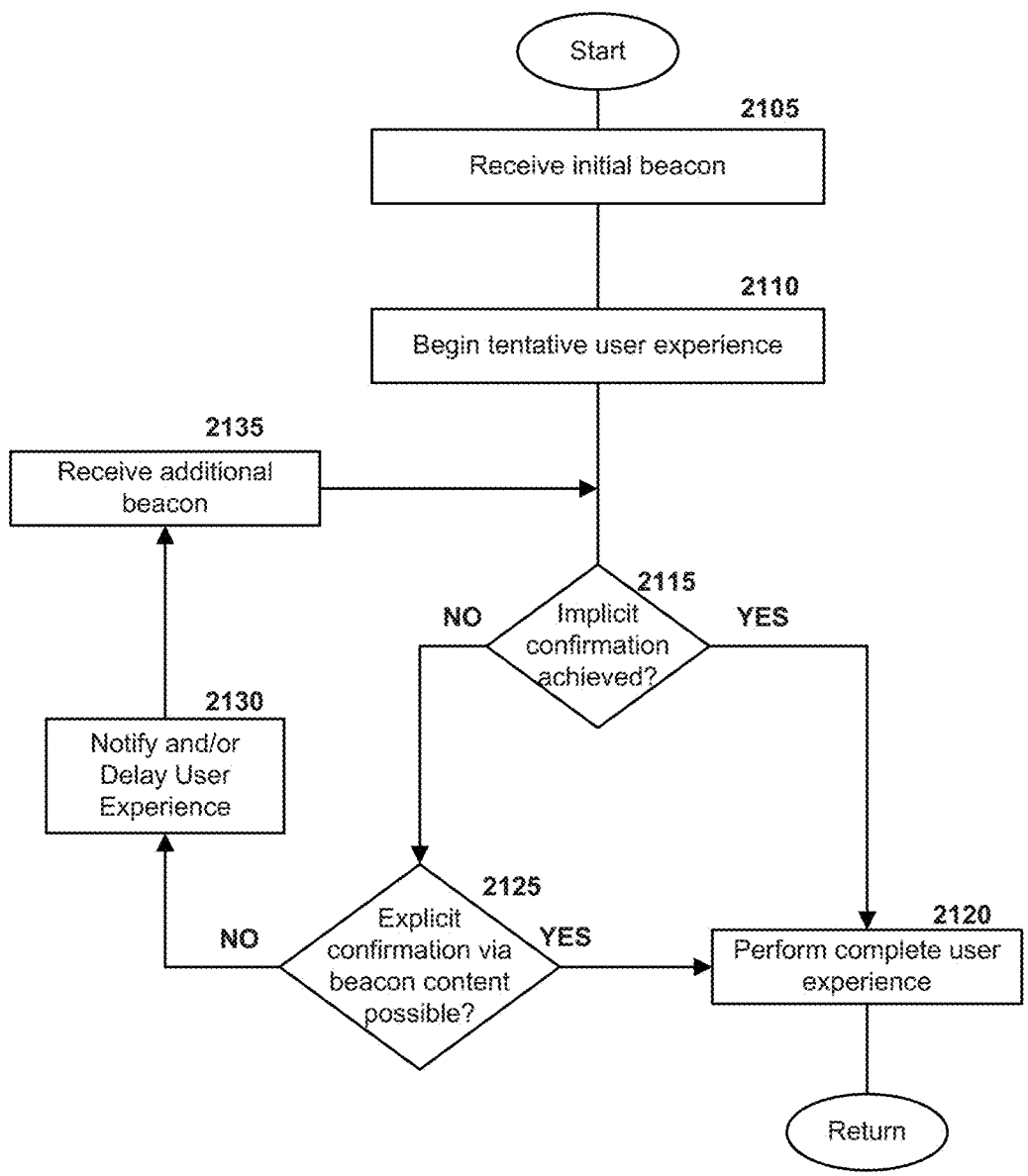
FIG. 21 is a flow diagram illustrating a high-level process for managing a user experience while securely processing beacon device information using a security pattern as may occur in some embodiments.

FIG. 21 is a flow diagram illustrating a high-level process for managing a user experience while securely processing beacon device information using a security pattern as may occur in some embodiments. At block 2105, the user device may receive an initial beacon message from the beacon device. At block 2110, the user device may begin the tentative user experience. For example, the user device may inform the user that a beacon device has been detected, but may refrain from performing any sensitive operations (e.g., exchanging user personal data).

At block 2115, the system may determine if the beacon device has been implicitly authenticated, for example, by comparing the power intensity patterns with a security pattern. If confirmation via the patterns has not yet been achieved, the system may determine if the beacon device has been explicitly authenticated at block 2125 (e.g., by reading the secure payload containing rolling key 320). If explicit authentication is not possible (e.g., an appropriate beacon containing a key has not yet arrived), the system may notify the user of the delay at block 2125 (e.g., by continuing to indicate that authentication is continuing). As a new beacon has arrived at block 2135, the system may again attempt implicit authentication using the pattern at block 2115. Once either explicit or implicit authentication finishes, the system may complete the user experience at block 2120 (e.g., by transmitting sensitive information).

Sonic Beacon Device

Figure 22:
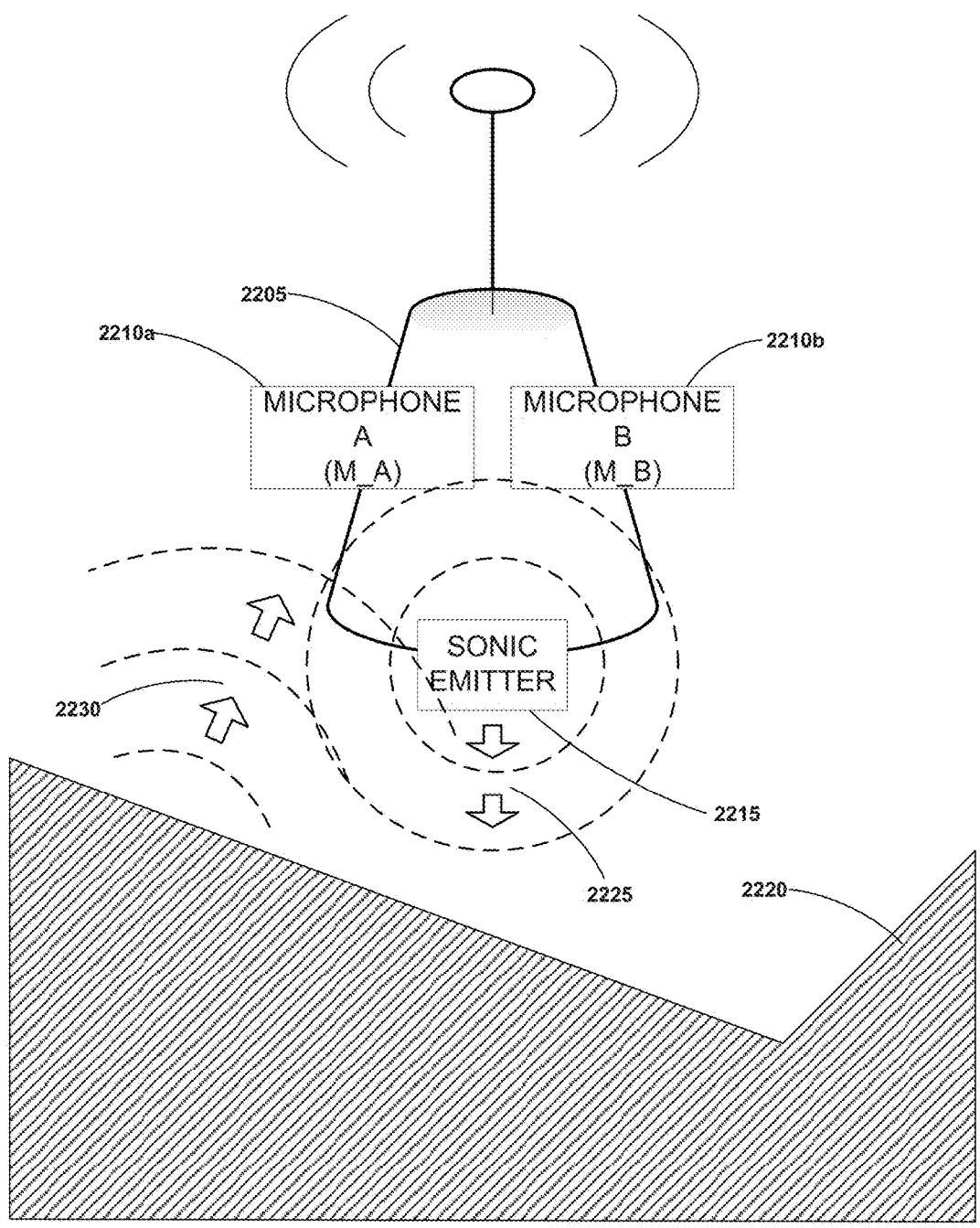
FIG. 22 is a block diagram of a beacon device incorporating sonic components as may occur in some embodiments.

FIG. 22 is a block diagram of a beacon device incorporating sonic components (referred to herein as a "sonic beacon device") as may occur in some embodiments. In some embodiments, the beacon device 2205 may include at least one sonic emitter 2215, e.g., an ultrasonic emitter, and one or more microphones 2210a and 2210b. In the illustrated example, two microphones 2210a and 2210b are provided to detect directional auditory signals received at the beacon device 2205. For example, the emitter 2215 may present an isotropic signal 2225 which propagates omnidirectionally away from the beacon device 2205 (in some embodiments, the propagation may be directional). This isotropic signal 2225 may encounter a surface 2220 resulting in a reflective signal 2230. The reflective signal 2230 may be received at one microphone before another, e.g., the signal may be received by microphone 2210a before microphone 2210b. In this manner, the directionality of the reflective signal 2230 may be determined at the beacon device 2205. An internal representation of the environment may be generated within the beacon device 2205 using known sonographic techniques (e.g., echolocation methods). The fidelity of the representation may depend upon the application and/or environment in which the beacon device 2205 will be deployed. For example, in some embodiments, it may only be desirable to know the distance to the nearest object. In other embodiments, a 3-dimensional representation of the local environment may be preferred.

Sonic Beacon Device—Environment Analysis

Figure 23:
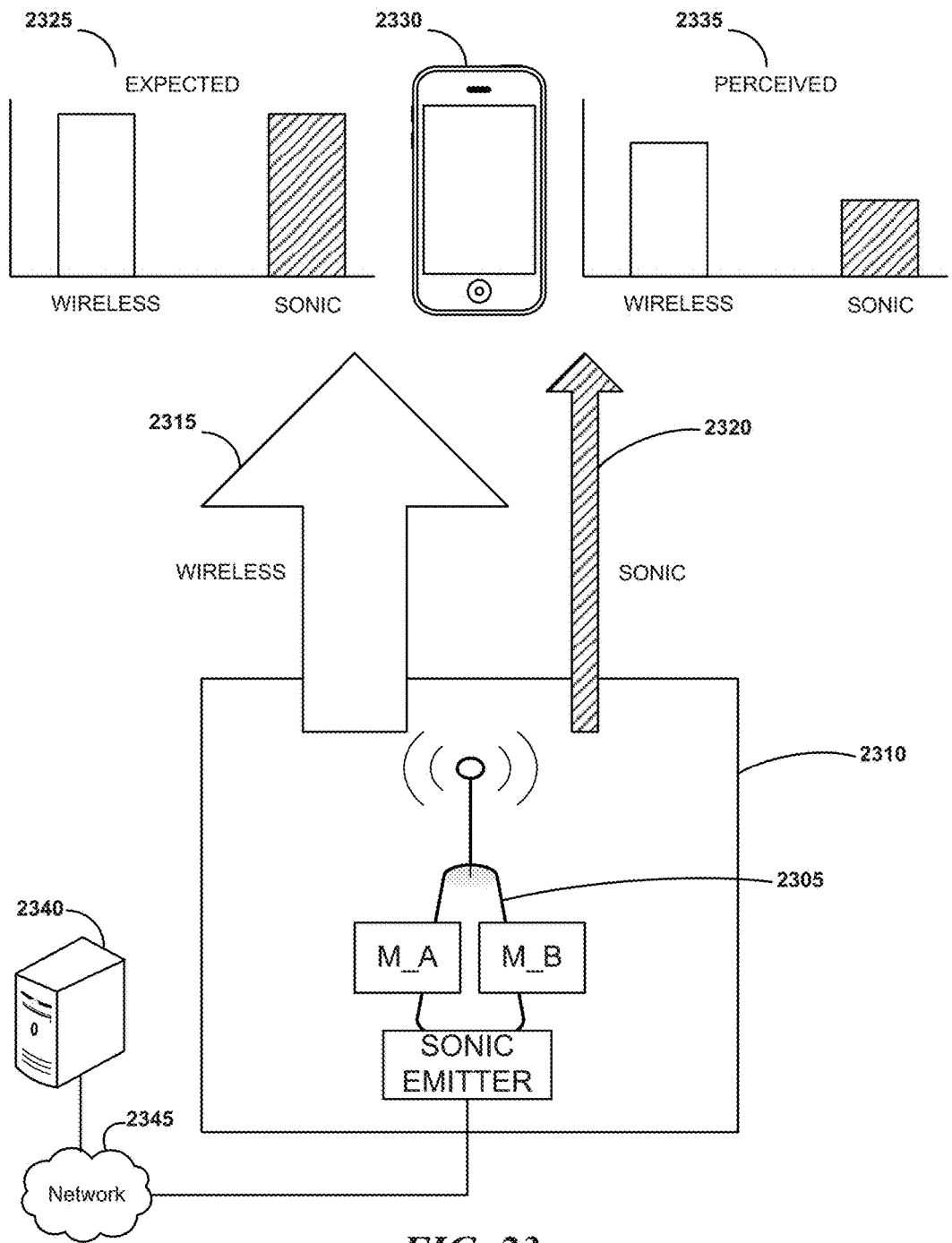
FIG. 23 is a block diagram indicating a relation between wireless and sonic signals received at a user device from a contained sonic beacon device as may occur in some embodiments.

FIG. 23 is a block diagram indicating a relation between wireless 2315 and sonic 2320 signals received at a user device from a contained sonic beacon device 2305 as may occur in some embodiments. For example, a distributor of the beacon device 2305 may require that installers and end-users place the beacon device 2305 in a location facilitating visual identification by passing users. Such an appropriate placement may be required by the agreement between the distributor and the installer. However, an installer may seek to avoid this requirement by concealing the beacon device 2305 in a container 2310, e.g., so as to surreptitiously communicate with user devices 2330.

To detect this behavior, various embodiments contemplate running an application on the user device 2330 which compares anticipated 2325 wireless and sonic signal strengths with those strengths actually received 2335. Here, the container 2310 may impede the wireless signal 2315 to varying degrees depending upon the container's 2310 thickness and composition. In isolation, the user device 2330 may infer that the beacon device 2305 is at a further distance than is actually the case, based upon the weaker wireless signal 2315. However, the sonic signal 2320 will be considerably more diminished than the wireless signal, as the air vibrations within the container 2310 will need to be vibrate the container 2310 and consequently the molecules external to the container 2310 before reaching the user device 2330. Thus, the perceived signal strength 2335 at the user device will not agree with the distance associated with the wireless signal. Were the beacon device 2305 unobstructed and at a distance commensurate with the wireless signal received at the beacon device 2305, the beacon device 2305 would have received a much stronger sonic signal. Thus, when the application on the user device detects the disparity, it can take appropriate action, e.g., notifying the user and/or a central server that the beacon device 2305 has been placed in a manner in violation of its distribution agreement. One will recognize that the roles may be reversed in some embodiments, e.g., where the user device 2330 communicates wireless and sonic signals to the beacon device 2305, which then compares their strength to infer the presence of a barrier or enclosure.

Figure 24:
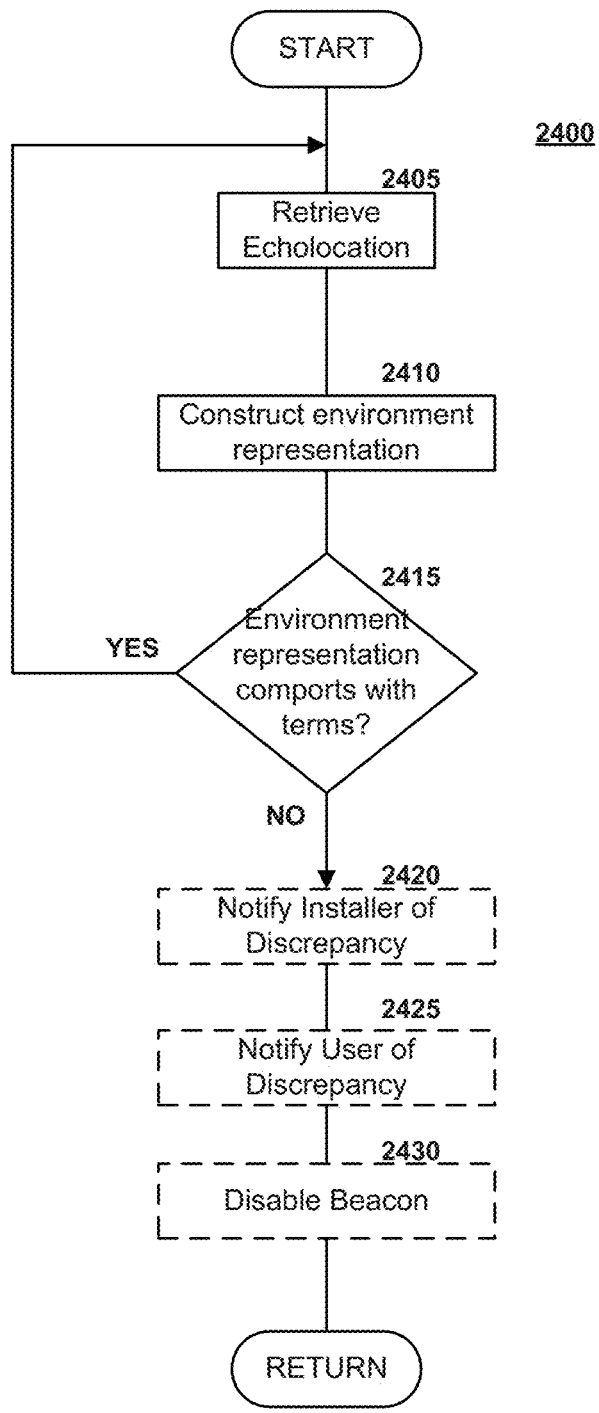
FIG. 24 is a flow diagram illustrating a process for assessing a sonic beacon device's environment to verify installation compliance as may occur in some embodiments.

FIG. 24 is a flow diagram illustrating a process 2400 for assessing a sonic beacon device's environment to verify installation compliance as may occur in some embodiments. For example, in some embodiments the beacon device 2305 may be in communication with a server 2340 via a network 2345 and may wish to inform the server 2340 of a breach of the installation agreement (e.g., independent of the presence of a user device 2330). Similarly, the beacon device 2305 may not wish to rely on a user device 2330 detecting a signal disparity to determine a breach of the agreement, or may wish to confirm that the disparity accurately reflects a breach. Accordingly, the beacon device 2305 may assess its environment independently.

At block 2405, the beacon device may retrieve the results of an echolocation session (e.g., the isotropic emission of a sonic signal and zero or more directional return signals). Based upon the echolocation results the system may construct a representation of the beacon device's local environment at block 2410. At block 2415, the beacon device may determine whether the environment representation comports with the installation terms of use or other contractual agreements and conditions (the contractual terms may declared prior to installation, but may also be received dynamically in the future in some embodiments, e.g., over a network connection). For example, the beacon device may identify the nearest object and determine if the object exceeds a minimum distance. Similarly, the beacon device may determine if it has been placed within an enclosed region in violation of the terms of use. As depicted by the "yes" direction from block 2415, the beacon device may periodically reassess the environment to verify that the terms of the license continue to be honored.

Where a breach has been detected, at block 2420, the system may notify the installer of the discrepancy (e.g., by notifying the installer's user device or by disabling the beacon device until the installer reactivates it). Additionally, or in the alternative, the system may notify any users in the vicinity of the discrepancy at block 2425. Similarly, the beacon device may disable itself at block 2430 until the distributor or installer resets the beacon device. As indicated, these blocks may be optional in some embodiments. In some embodiments, the beacon device may notify a distributor when the installer is in violation of the terms/policies (between the distributor and installer) and the distributor may then have the option of issuing a network command (e.g., an encrypted password) disabling the beacon device.

Sonic Beacon Device—"Touch" and Motion Detection

Figure 25:
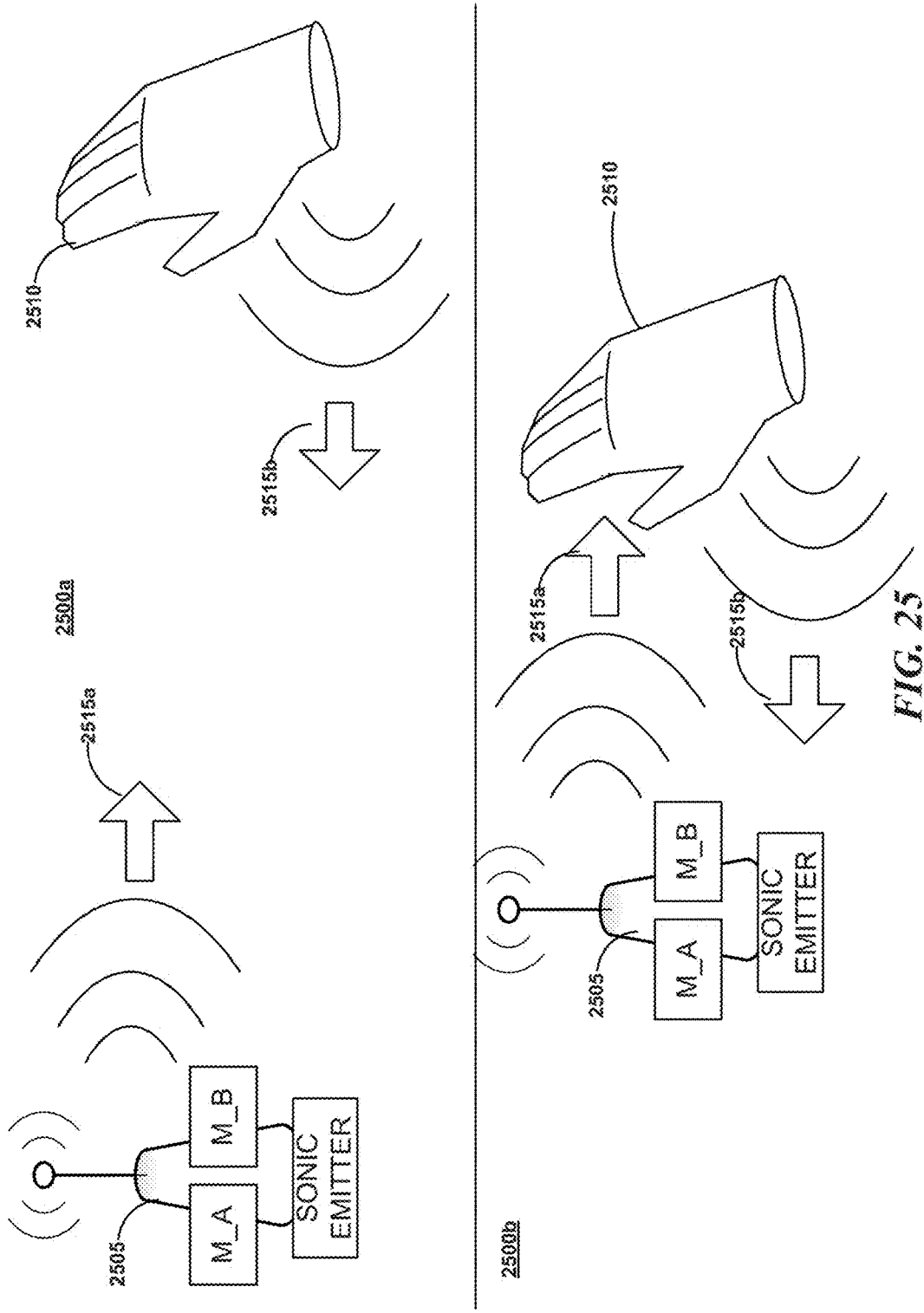
FIG. 25 is a block diagram depicting gesture detection with a sonic beacon device as may occur in some embodiments.

FIG. 25 is a block diagram depicting gesture detection with a sonic beacon device as may occur in some embodiments. Gesture detection may involve, e.g., detecting when a user "touches" or comes into close proximity to the beacon device 2505. For example, the user may acknowledge acceptance of a license agreement by "touching" the beacon device 2505. In the situation 2500a, an outbound sonic signal 2515a may encounter a user's hand 2510 (or the user's handheld device, etc.). This may generate a reflective sonic signal 2515b which will propagate back to the beacon device 2505 and be received at the beacon device's 2505 microphones. Because the user's hand 2510 and the beacon device 2505 are widely separated in situation 2500a there will be a considerable delay between when the sonic signal 2515a is generated and the reflective signal 2515b is received at the beacon device 2505. When this delay exceeds a threshold, the beacon device 2505 may not consider the hand 2510 to "touch" the beacon device 2505.

In contrast, in situation 2500b the beacon device 2505 and the user's hand 2510 are sufficiently close together that the delay may be less than a threshold. Here, the beacon device 2505 may contextually construe the hand 2510 as touching the beacon device 2505. The touch determination may depend upon the context in which the beacon device is applied. For example, during a "setup" or "installation" phase the beacon device may be receptive to touch interactions, but not during an "active" or "in-use" phase. Thus, the touch commands may be used to calibrate or activate the beacon device. Conversely, touch commands may be used by users to confirm interactions with the beacon device. For example, the user may authorize tracking of their location and their interaction with the beacon device using an application on their mobile device. The mobile device may prompt the user to confirm the authorization by physically placing their hand or mobile device within touch distance of the beacon device.

Though a direct distance determination may suffice in some embodiments, in some embodiments the beacon device may consider more detailed representations of its local environment. For example, rather than detecting a distance to user's hand or mobile device, the beacon device may detect a gesture performed by the user (e.g., involving distances and/or orientations of the user's hand over time). While the user device may transmit, via, e.g., the wireless channel, inertial measurement data, in some embodiments the sonic beacon device may also anticipate the orientation of the user device based upon its reception and/or generation capabilities.

Figure 26:
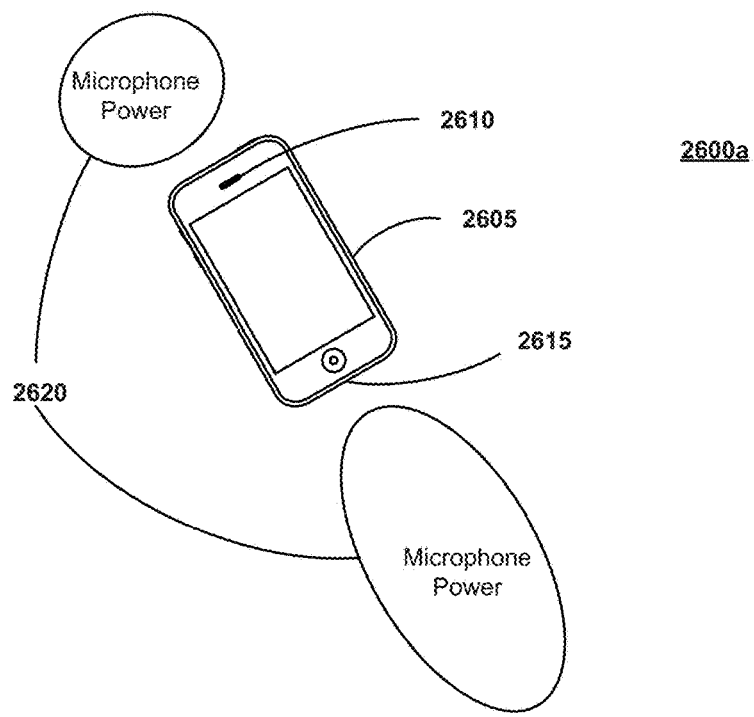
FIG. 26 is a block diagram depicting the directional emission and reception power pattern at a mobile device as may be considered in some embodiments.
Figure 26:
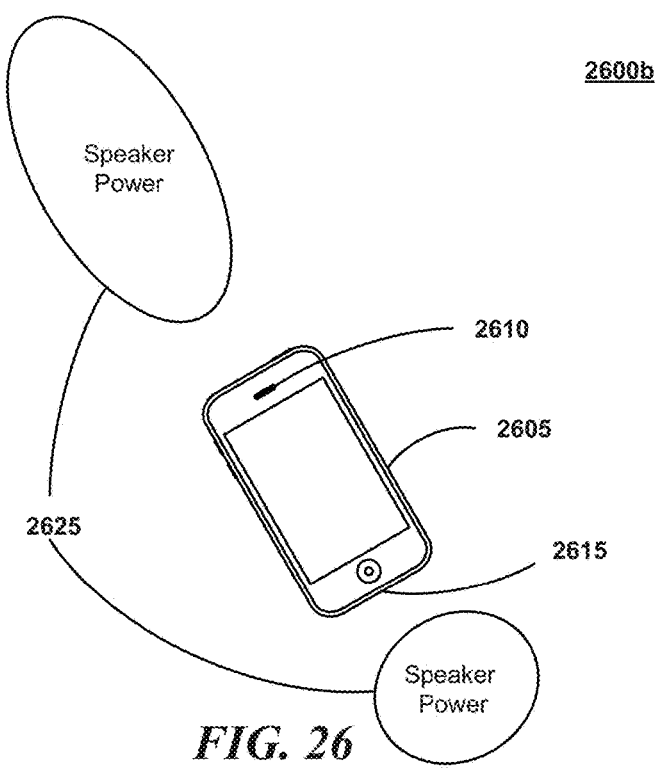

For example, FIG. 26 is a block diagram depicting the directional emission and reception power pattern at a mobile device 2605 as may be considered in some embodiments. This example mobile device 2605 possesses a microphone 2615 for receiving user speech and a speaker 2610 for presenting audio to the user. Based on the mobile device's 2605 form factor the microphone and speaker may have different asymmetric receptive power distributions 2620 and 2625 respectively. Thus, the microphone 2615 may receive a sonic signal with greater power strength from some directions than others. Conversely, the speaker 2610 may emit sound with greater strength in some directions than others. The sonic beacon device, or an application running on the user's mobile device, may determine the mobile device's form factor and corresponding power distributions (e.g., based on a look up table). Correlations between emitted sonic signals either at the beacon device or at the user mobile device with different relative orientations may be used to infer the mobile device's orientation. In some embodiments, this determination may be assisted by inertial measurement information from the mobile device. For example, given an orientation of the mobile device relative to the Earth, the sonic interaction may then indicate the sonic beacon device's orientation relative to the user mobile device.

Figure 27:
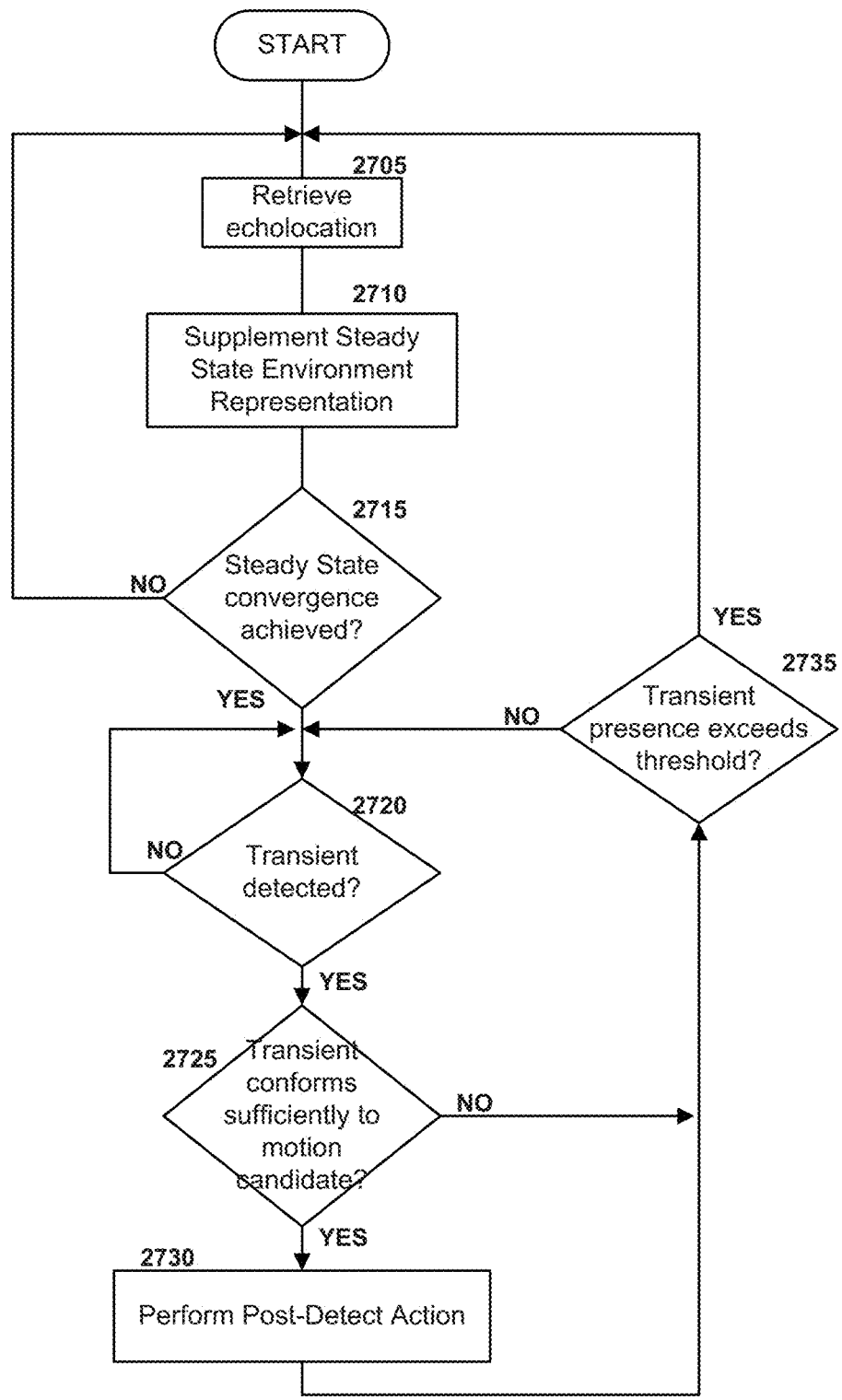
FIG. 27 is a flow diagram illustrating a process for modeling the environment around a sonic beacon device, e.g., for gesture detection, as may occur in some embodiments.

FIG. 27 is a flow diagram illustrating a process for modeling the environment around a sonic beacon device, e.g., for gesture detection, as may occur in some embodiments. Thought the steps in this figure are discussed with respect to operations at the sonic beacon device, one will recognize that the user mobile device may assist with various of the operations in some embodiments. At block 2705, the sonic beacon device may retrieve the echolocation results. These results may be from an initial emission from the emitter at the sonic beacon device. At block 2710, the beacon device may supplement a steady state representation of the environment. For example, the steady state representation may reflect a plurality of depth values for various directions about the beacon device. Initially, this representation may simply indicate an infinite distance for each direction.

At block 2715, the beacon device and/or user device may determine whether a steady state convergence has been achieved. For example, each device may determine whether the depths associated with each direction are within a threshold difference of their value at a preceding time. If a steady state has not been achieved, then the device may continue to retrieve echolocation results at block 2705. The steady state for the beacon device may reflect the character of its environment when no users are in the vicinity.

When a steady state has been achieved, at block 2720 the device may determine if a transient has been detected. A transient may appear, e.g., as more than a threshold number of directions being associated with new depths beyond a threshold distance beyond their previous value. At block 2725, the beacon device may determine if the transient conforms to a motion candidate. For example, if every direction's depth value changes, then the beacon device is likely being rotated or translated. If this behavior continues long enough, at block 2735 the beacon device may resolve to identify a new steady state representation once the motion stops.

However, if the transient is localized to only a handful of contiguous directions then it is likely an object, such as a user device, is approaching the beacon device. Accordingly, at block 2730 the beacon device my perform a post-detection action. For example, the beacon device may emit a wireless beacon message to engage the user device in an interaction. The action may depend upon the context, e.g., where the beacon device is expecting a "touch" verification, then the post-detection action may involve confirming that the transient corresponds to a hand motion.

Sonic Beacon Device—Assisted Installation and Calibration

Figure 28:
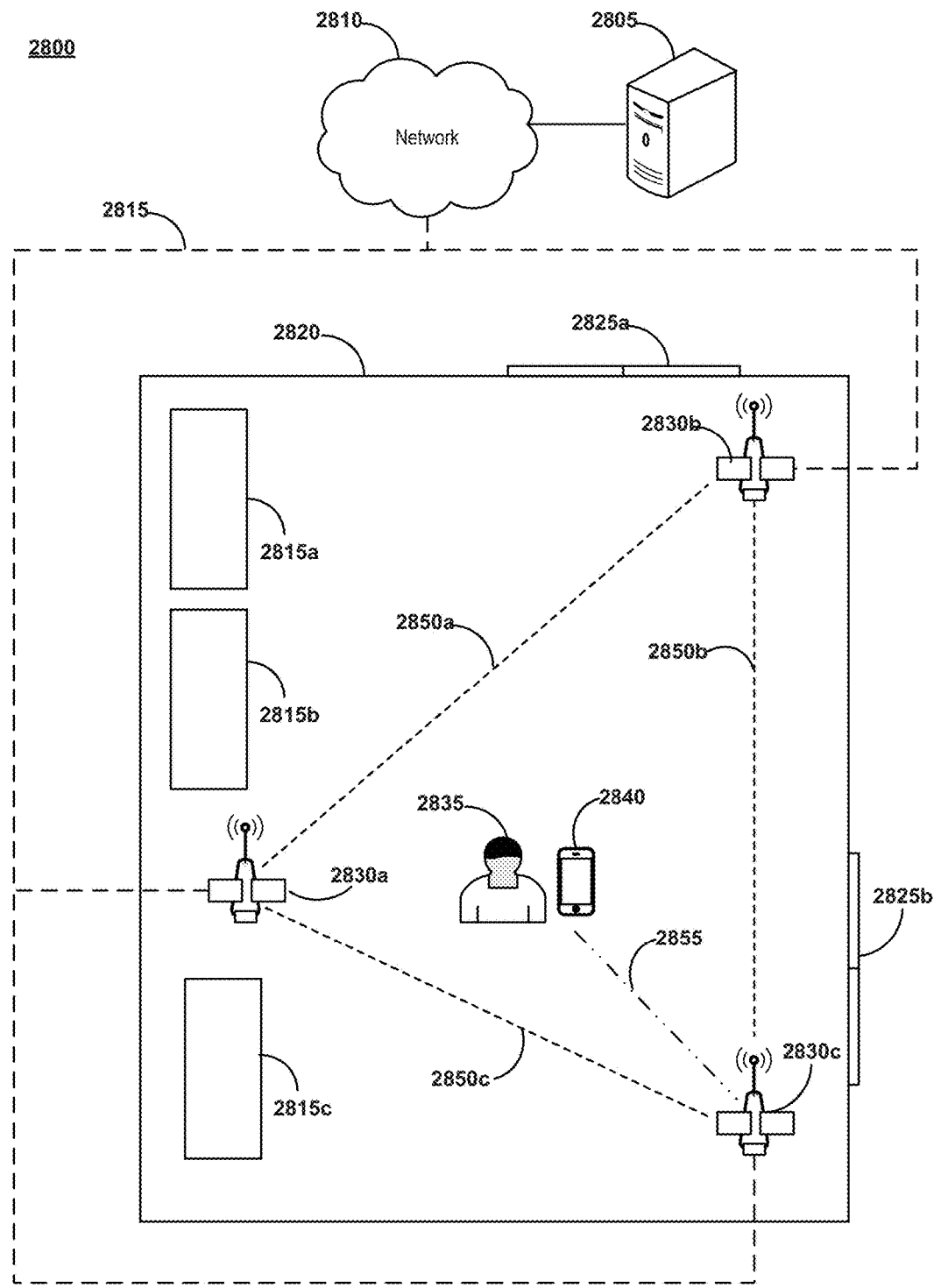
FIG. 28 is a block diagram illustrating installation and calibration of a plurality of sonic beacon devices as may occur in some embodiments.

FIG. 28 is a block diagram illustrating installation and calibration of a plurality of sonic beacon devices as may occur in some embodiments. An installer 2835 may place a plurality of sonic beacon devices 2830a, 2830b, 2830c around a store 2820. Sonic beacon device 2830a may be placed near merchandise racks 2815a, 2815b, 2815c. Beacon device 2830b may be placed near an entrance 2825a and beacon device 2830c may be placed near an entrance 2825b. The beacon devices 2830a, 2830b, 2830c may communicate sonically (e.g., ultrasonically) as represented by connections 2850a, 2850b, and 2850c. The beacon devices 2830a, 2830b, 2830c may include directional emitters and/or directional microphone receivers. The beacon devices 2830a, 2830b, 2830c may be connected to a wireless network 2815, which may communicate with a server 2805 across a wider network 2810 (e.g., the Internet). The server 2805 may also be located locally at the store premises.

The installer 2835 may use a mobile device 2840 to configure the beacon devices. For example, the installer 2835 may make a direct connection 2855, either wireless or sonic, to the beacon device 2830c. In some embodiments, when an installer specifies a function of one beacon device, that beacon device may communicate the assignment to other beacon devices to facilitate their own role assumptions. For example, the installer 2835 may direct beacon device 2830c to assume a "greeter" functionality (e.g., to recognize when user's enter the store and to notify their devices of various discounts). Beacon device 2830c may communicate this assignment to beacon device 2830b across connection 2850b. Beacon device 2830b may then assess its surroundings. If door 2825a has been detected as part of beacon device's 2830b steady state assessment, and if the depth determinations resemble those at beacon device 2830c, then the beacon device 2830b may assume the same role. Conversely, beacon device 2830a may receive a similar communication and recognize that its environment bears little resemblance to the other devices and may await the installer's explicit configuration. These implicit configuration assumptions may be determined based on a correlation and/or machine learning approach applied to the depth information around each beacon device. As described in greater detail herein, an explicitly configured device may also propose role configurations to other peer devices.

Figure 29:
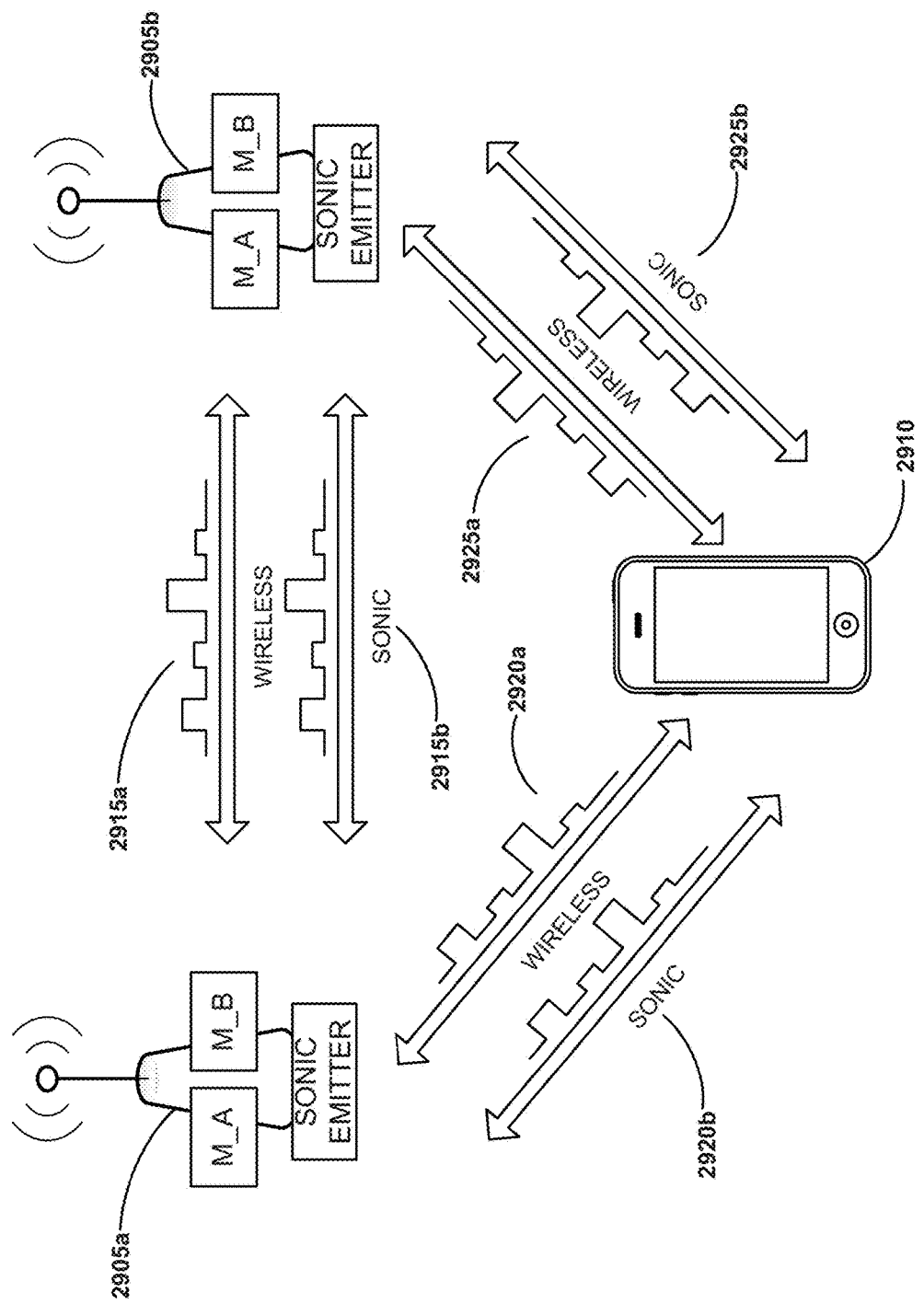
FIG. 29 is a block diagram illustrating sonic beacon device and user device communication as may occur in some embodiments.

FIG. 29 is a block diagram illustrating sonic beacon device and user device communication as may occur in some embodiments. For example, when assuming role configurations as in FIG. 28, a beacon device 2905a may communicate with another beacon device 2905b across one or more wireless 2915a and sonic 2915b channels. Similarly, each of the beacon devices 2905a and 2905b may communicate with a user device 2910 across wireless 2920a, 2925a and sonic 2920b, 2925b channels.

Figure 30:
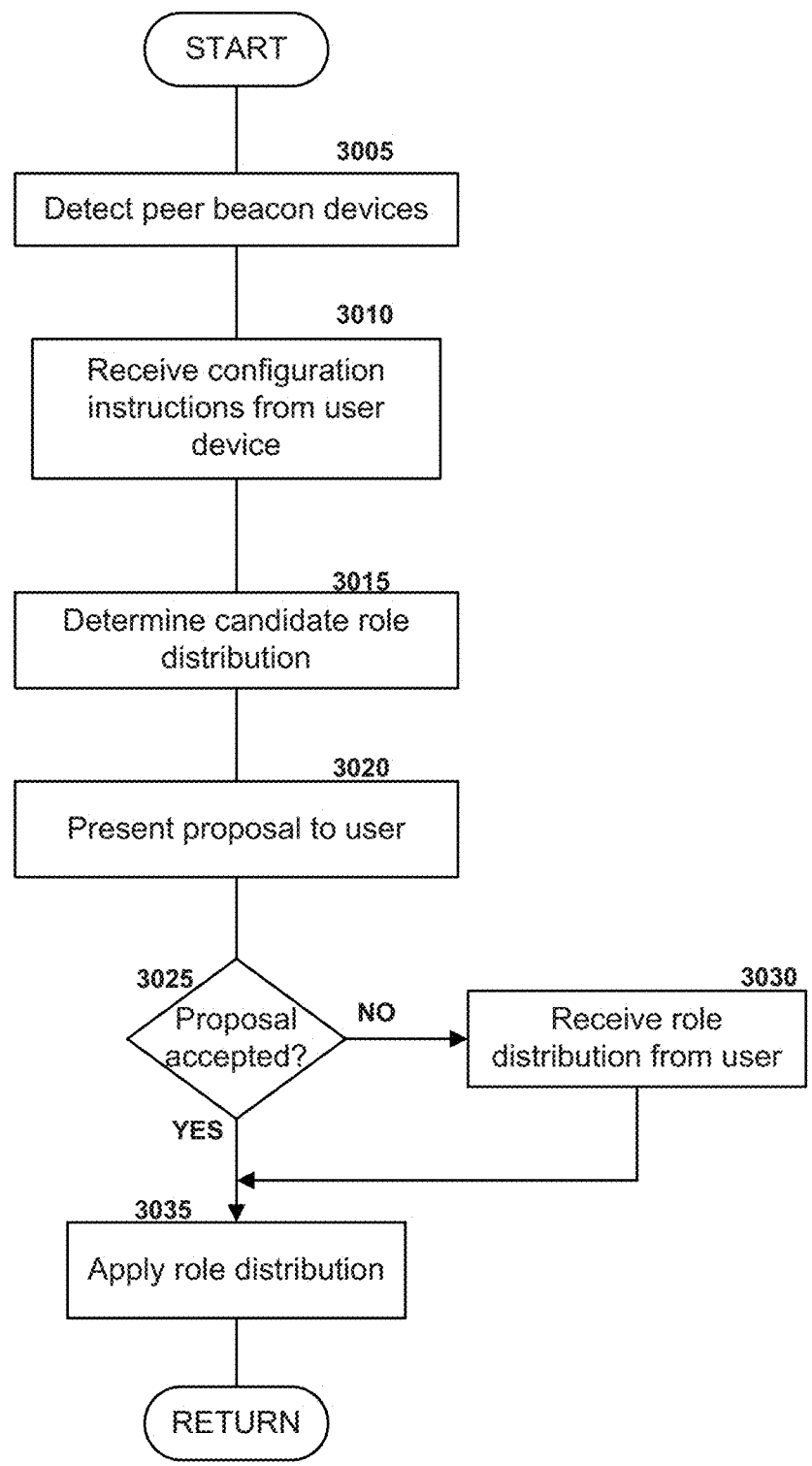
FIG. 30 is a flow diagram illustrating an installation and calibration process using a sonic beacon device as may occur in some embodiments.

FIG. 30 is a flow diagram illustrating an installation and calibration process using a sonic beacon device as may occur in some embodiments. At block 3005, a beacon device may detect peer beacon devices (e.g., sonically or via wireless communication). At block 3010, the beacon device may receive explicit instructions from a user device (e.g., to assume a role performing customer checkout services). At block 3015, the beacon device may determine a candidate role distribution based, e.g., on the instructions. For example, where the installer has specified that the beacon device assume a checkout service role, the beacon device may consider communicating sonically to the other beacon devices that they should assume a discount notification role as a default.

In some embodiments at block 3020, the beacon device may communicate this proposed distribution to an installer (e.g., by communicating on a sonic or wireless channel with the user device). If the proposal is not accepted by the installer at block 3025, the beacon device may receive a role distribution from the installer at block 3030. Alternatively, in some embodiments the beacon device may simply not seek to distribute a configuration to other beacon devices if the user has indicated that they will perform the configuration explicitly. Where the installer has accepted a proposed distribution or specified one explicitly, the beacon device may propagate the role distribution to the peer beacon devices at block 3035. In some embodiments, beacon devices indicate their positioning relative to other beacon devices to the installer so that the installer may optimize the location of the beacons to maximize coverage for a given region. As mentioned, the relative positioning may be determined by using sonic and/or Bluetooth signals.

Sonic Beacon Device—Complementary Channels Across Embodiments

Figure 31:
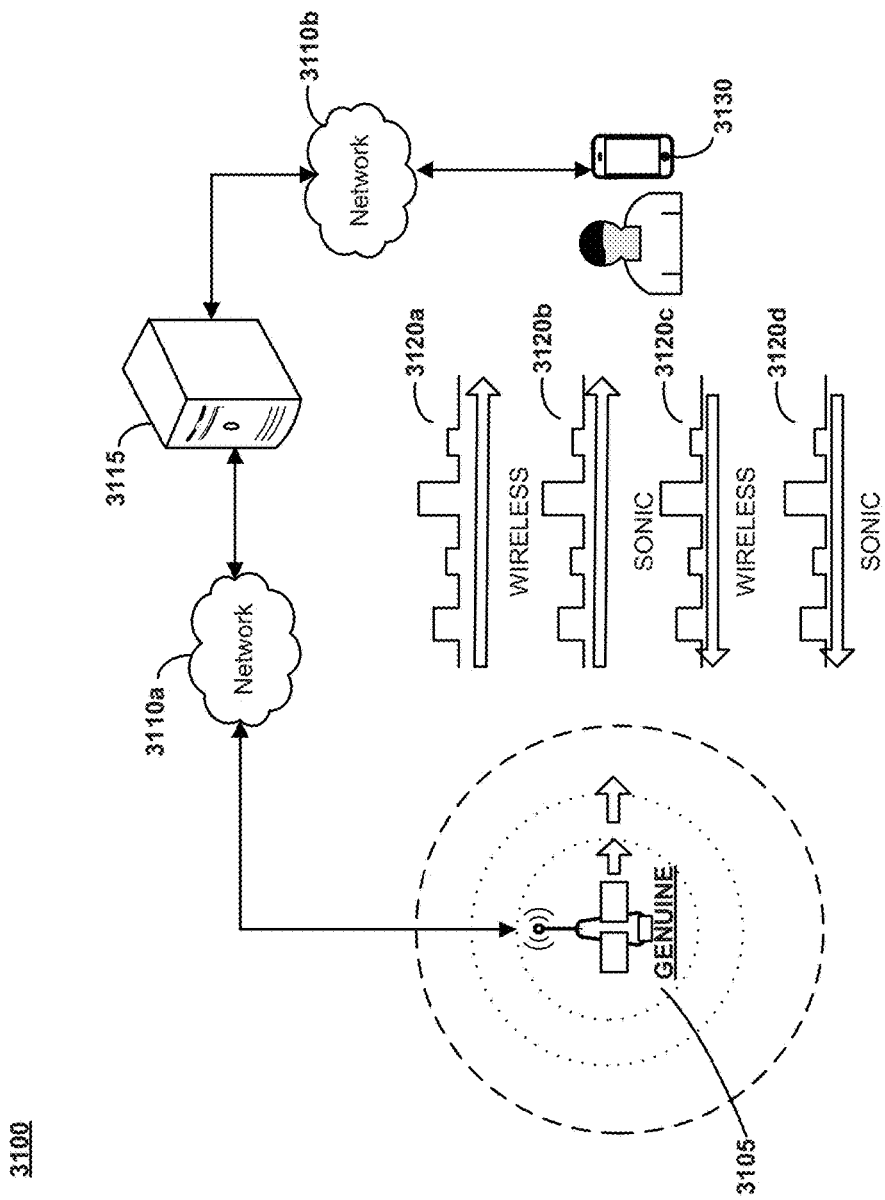
FIG. 31 is a block diagram illustrating example user device interactions with a sonic beacon device implementing a communication exchange, e.g., a pattern security exchange, incorporating sonic communication as may occur in some embodiments.

Generally, many embodiments disclosed in this specification may take advantage of the sonic and/or wireless channels (e.g., as a beacon message or an 802.11 connection) in communicating signals to or from a user device or another beacon device. For example, FIG. 31 is a block diagram illustrating example user device interactions with a sonic beacon device implementing a communication exchange, e.g., a pattern security exchange, incorporating sonic communication as may occur in some embodiments. Here, a genuine beacon device 3105 may emit and receive sonic and wireless signals 3120a, 3120b, 3120c, and 3120d from a user device 3130. Operations discussed herein may be split across the wireless and sonic channels. For example, a security pattern received at the beacon device 3105 across network 3110a from a server 3115 may be transmitted to the user device 3130 across both sonic and wireless channels. The user device 3130 may then communicate across a network 3110b with the server 3115 to confirm the security pattern's authenticity. By splitting the security pattern across both sonic and wireless channels it may be even more difficult for the security pattern to be detected and/or impersonated.

Computer System

Figure 32:
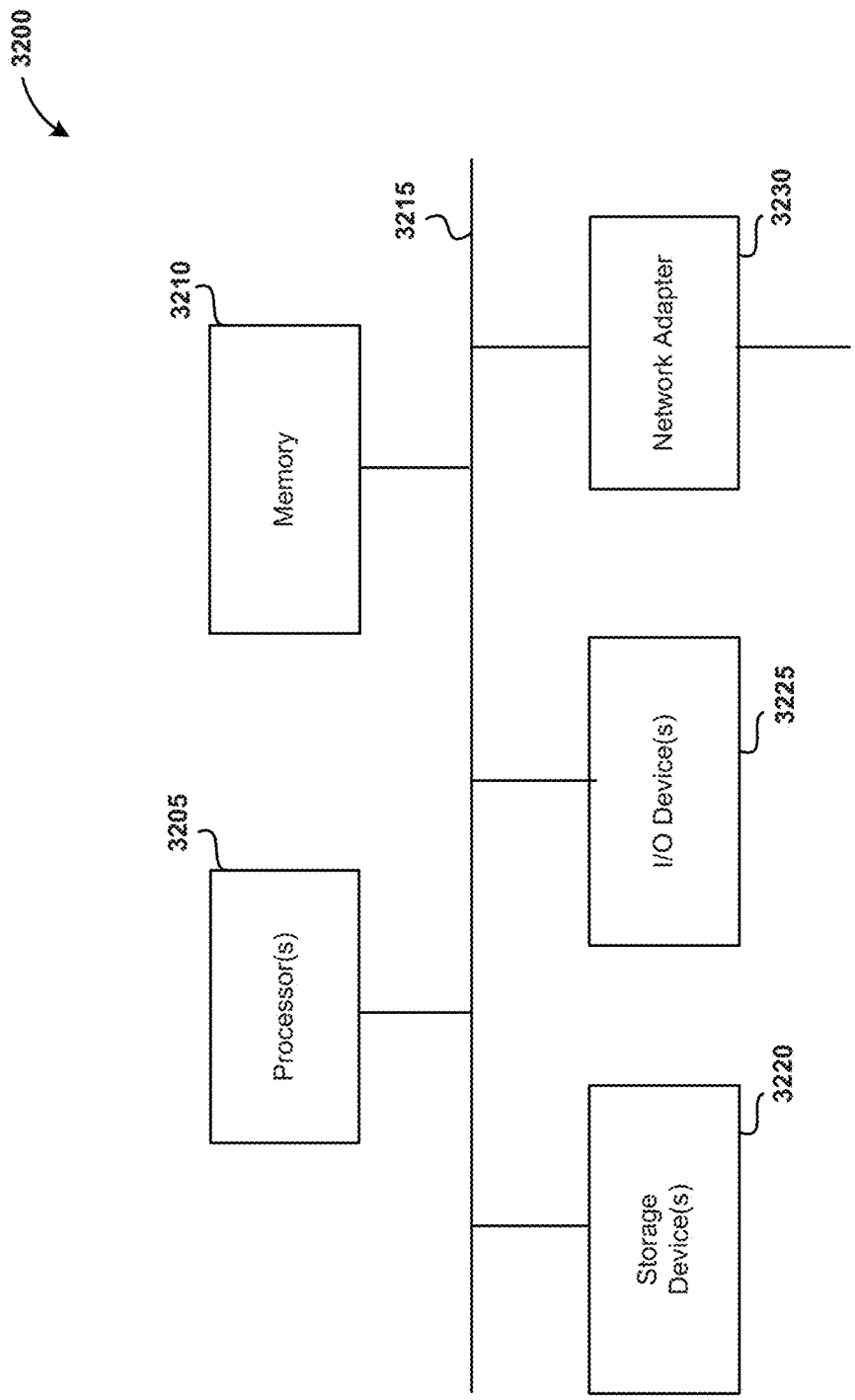
FIG. 32 is a block diagram of a computer system as may be used to implement features of some of the embodiments.

FIG. 32 is a block diagram of a computer system as may be used to implement features of some of the embodiments. The computing system 3200 may include one or more central processing units ("processors") 3205, memory 3210, input/output devices 3225 (e.g., keyboard and pointing devices, display devices), storage devices 3220 (e.g., disk drives), and network adapters 3230 (e.g., network interfaces) that are connected to an interconnect 3215. The interconnect 3215 is illustrated as an abstraction that represents any one or more separate physical buses, point to point connections, or both connected by appropriate bridges, adapters, or controllers. The interconnect 3215, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 3210 and storage devices 3220 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 3210 can be implemented as software and/or firmware to program the processor(s) 3205 to carry out actions described above. In some embodiments, such software or firmware may be initially provided to the processing system 3200 by downloading it from a remote system through the computing system 3200 (e.g., via network adapter 3230).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A mobile device comprising:
   at least one sonic-signal receiver;
   at least one wireless-signal receiver;
   at least one processor;
   at least one memory configured to store instructions that when executed cause the at least one processor to perform a method comprising:
   receiving, via the at least one sonic-signal receiver, a sonic signal from a beacon device, wherein the sonic signal received at the mobile device has a first sonic-signal strength;
   comparing the first sonic-signal strength with a second sonic-signal strength so as to form a first result;
   receiving, via the at least one wireless-signal receiver, a wireless signal from the beacon device, wherein the wireless signal received at the mobile device has a first wireless-signal strength;
   comparing the first wireless-signal strength with a second wireless-signal strength so as to form a second result; and
   determining, based on the first result and the second result, whether the beacon device is installed in compliance with installation guidelines associated with the beacon device;
   wherein determining whether the beacon device is installed in compliance with the installation guidelines associated with the beacon device comprises:
   determining that an enclosure positioned between the beacon device and the mobile device does not comply with the installation guidelines;
   presenting a notification that the enclosure does not comply with the installation guidelines; and
   disabling the beacon device.

2. The mobile device of claim 1, wherein determining whether the beacon device is installed in compliance with the installation guidelines associated with the beacon device comprises:
   determining a distance from the beacon device to the enclosure based on the first result and the second result; and
   determining whether the distance complies with the installation guidelines associated with the beacon device.

3. The mobile device of claim 1, wherein the first sonic-signal strength is scaled based upon a sensitivity of the mobile device.

4. The mobile device of claim 1, wherein the mobile device is a testing mobile device, and wherein presenting the notification that the enclosure does not comply with the installation guidelines comprises:
   transmitting a message to a configuration mobile device used to configure the beacon device.

5. The mobile device of claim 1, wherein the first wireless-signal strength is scaled based upon a sensitivity of the mobile device.

6. The mobile device of claim 1, wherein the second sonic-signal strength is an anticipated sonic signal strength.

7. The mobile device of claim 1, wherein the second wireless-signal strength is an anticipated wireless signal strength.

8. A computer-implemented method for verifying a compliant beacon device installation comprising:
receiving, via at least one sonic-signal receiver at a beacon device, a sonic signal from a mobile device, wherein the sonic signal received at the beacon device has a first sonic-signal strength;
comparing, at the beacon device, the first sonic-signal strength to a second sonic-signal strength so as to form a first result;
receiving, via at least one wireless-signal receiver at the beacon device, a wireless signal from the mobile device, wherein the wireless signal received at the beacon device has a first wireless-signal strength;
comparing, at the beacon device, the first wireless-signal strength to a second wireless-signal strength so as to form a second result;
detecting, based on the first result and the second result, a presence of an enclosure; and
determining whether the enclosure complies with installation guidelines associated with the beacon device;
wherein determining whether the enclosure complies with the installation guidelines associated with the beacon device comprises:
determining that the enclosure is positioned between the beacon device and the mobile device and the enclosure does not comply with the installation guidelines;
presenting a notification that the enclosure does not comply with the installation guidelines; and
disabling the beacon device.

9. The computer-implemented method of claim 8, wherein determining whether the enclosure complies with the installation guidelines associated with the beacon device comprises:
determining a distance from the beacon device to the enclosure based on the first result and the second result; and
determining whether the distance complies with the installation guidelines associated with the beacon device.

10. The computer-implemented method of claim 8, wherein the first sonic-signal strength is scaled based upon a sensitivity of the mobile device.

11. The computer-implemented method of claim 8, wherein the mobile device is a testing mobile device, and wherein presenting the notification that the enclosure does not comply with the installation guidelines comprises:
transmitting a message to a configuration mobile device used to configure the beacon device.

12. The method of claim 8, further comprising scaling the first wireless-signal strength based upon a sensitivity of the mobile device.

13. A non-transitory computer-readable medium comprising instructions that when executed cause at least one processor to perform a method comprising:
receiving, via at least one sonic-signal receiver at a beacon device, a sonic signal from a mobile device, wherein the sonic signal received at the beacon device has a first sonic-signal strength;
comparing, at the beacon device, the first sonic-signal strength with an anticipated sonic-signal strength so as to form a first result;
receiving, via at least one wireless-signal receiver at the beacon device, a wireless signal from the mobile device, wherein the wireless signal received at the beacon device has a first wireless-signal strength;
comparing, at the beacon device, the first wireless-signal strength to an anticipated wireless-signal strength so as to form a second result;
detecting, based on the first result and the second result, a presence of an enclosure; and
determining whether the detected enclosure complies with installation guidelines associated with the beacon device, the method further comprising instructions for determining whether the enclosure complies with the installation guidelines associated with the beacon device by:
determining that the enclosure is positioned between the beacon device and the mobile device and the enclosure does not comply with the installation guidelines;
presenting a notification that the enclosure does not comply with the installation guidelines; and
disabling the beacon device.

14. The non-transitory computer-readable medium of claim 13, wherein the instructions for determining whether the enclosure complies with the installation guidelines associated with the beacon device include instructions for:
determining a distance from the beacon device to the enclosure based on the first result and the second result; and
determining whether the distance complies with the installation guidelines associated with the beacon device.

15. The non-transitory computer-readable medium of claim 13, further comprising instructions for scaling the first sonic-signal strength-based upon a sensitivity of the mobile device.

16. The non-transitory computer-readable medium of claim 13, wherein the mobile device is a testing mobile device, and wherein the instructions for presenting the notification that the enclosure does not comply with the installation guidelines includes instructions for:
transmitting a message to a configuration mobile device used to configure the beacon device.

17. The non-transitory computer-readable medium of claim 13, further comprising instructions for scaling the first wireless-signal strength based upon a sensitivity of the mobile device.

* * * * *